United States Patent [19]
Fadem

[11] Patent Number: 5,090,013
[45] Date of Patent: * Feb. 18, 1992

[54] TIME SLOT PROTOCOL IN THE TRANSMISSION OF DATA IN A DATA PROCESSING NETWORK

[75] Inventor: Richard J. Fadem, Roslyn Heights, N.Y.

[73] Assignee: NCR Corporation, Dayton, Ohio

[*] Notice: The portion of the term of this patent subsequent to May 10, 2005 has been disclaimed.

[21] Appl. No.: 515,528

[22] Filed: Apr. 26, 1990

Related U.S. Application Data

[63] Continuation of Ser. No. 893,510, Aug. 5, 1986, abandoned.

[51] Int. Cl.$^5$ .............................................. H04J 3/02
[52] U.S. Cl. ................................ 370/85.8; 370/85.1; 370/95.2
[58] Field of Search .............. 370/85.1, 100.1, 105.1, 370/77, 85.8, 95.2, 24, 29, 32, 13, 67, 95.1, 85.7, 73, 124; 340/825.03, 825.06, 825.07, 825.08, 825.14, 825.52, 825.54; 379/92, 93; 358/84–86; 455/2–6

[56] References Cited

U.S. PATENT DOCUMENTS

| | | | |
|---|---|---|---|
| 3,544,976 | 12/1970 | Collins | 364/200 |
| 3,630,932 | 9/1971 | Kerr et al. | 370/77 |
| 3,821,706 | 6/1974 | Bennett et al. | 370/24 |
| 3,898,373 | 8/1975 | Walsh | 178/2 C |
| 3,924,240 | 12/1975 | Given | 370/85.1 |
| 4,062,059 | 12/1977 | Suzuki et al. | 364/200 |
| 4,078,228 | 3/1978 | Miyazaki | 370/86 |
| 4,097,692 | 6/1978 | Felix | 370/85 |
| 4,199,661 | 4/1980 | White et al. | 370/91 |
| 4,199,662 | 4/1980 | Lowe, Jr. | 370/85.8 |
| 4,347,604 | 8/1982 | Saito et al. | 455/5 |
| 4,525,832 | 6/1985 | Miyao | 370/85.1 |
| 4,538,262 | 8/1985 | Sinniger | 370/85 |
| 4,554,657 | 11/1985 | Wilson | 370/85 |
| 4,594,705 | 6/1986 | Yahata et al. | 370/85.1 |
| 4,630,263 | 12/1986 | Townsend | 370/85 |
| 4,631,721 | 12/1986 | Ono et al. | 370/85 |
| 4,725,836 | 2/1988 | Guidos | 370/85.1 |
| 4,744,077 | 5/1988 | Fadem et al. | 370/85.8 |

FOREIGN PATENT DOCUMENTS

| | | |
|---|---|---|
| 2365250 | 4/1978 | France . |
| 1588184 | 4/1981 | United Kingdom . |
| 2110442 | 6/1983 | United Kingdom . |

OTHER PUBLICATIONS

Colloque International sur la Teleimformatique, Paris, 24–28 Mar. 1969, part II, Editions Chiron (Paris, FR), M. Tambutte: "Transmission de donnes sur reseau in boucle", pp. 697–701 (plus English translation).

Primary Examiner—Douglas W. Olms
Assistant Examiner—Alpus H. Hsu
Attorney, Agent, or Firm—Douglas S. Foote; Floyd A. Gonzalez

[57] ABSTRACT

A data processing network having a host computer, a plurality of terminals, a cable for transmitting data between the host computer and the terminals, and a controller for controlling character data sent from the host computer to the terminals and keystroke data sent from the terminals to the host computer. Data is transmitted in a cycle of time frames, with each time frame having a plurality of time slots, one time slot being allocated to the transmission of one character from the host computer to a designated terminal. Further, each time frame includes a time slot for the transmission of a keystroke from a designated terminal to the host computer. The terminal which may transmit a keystroke to the host computer is designated in a syn/poll character generated at the beginning of each time frame by the controller.

20 Claims, 40 Drawing Sheets

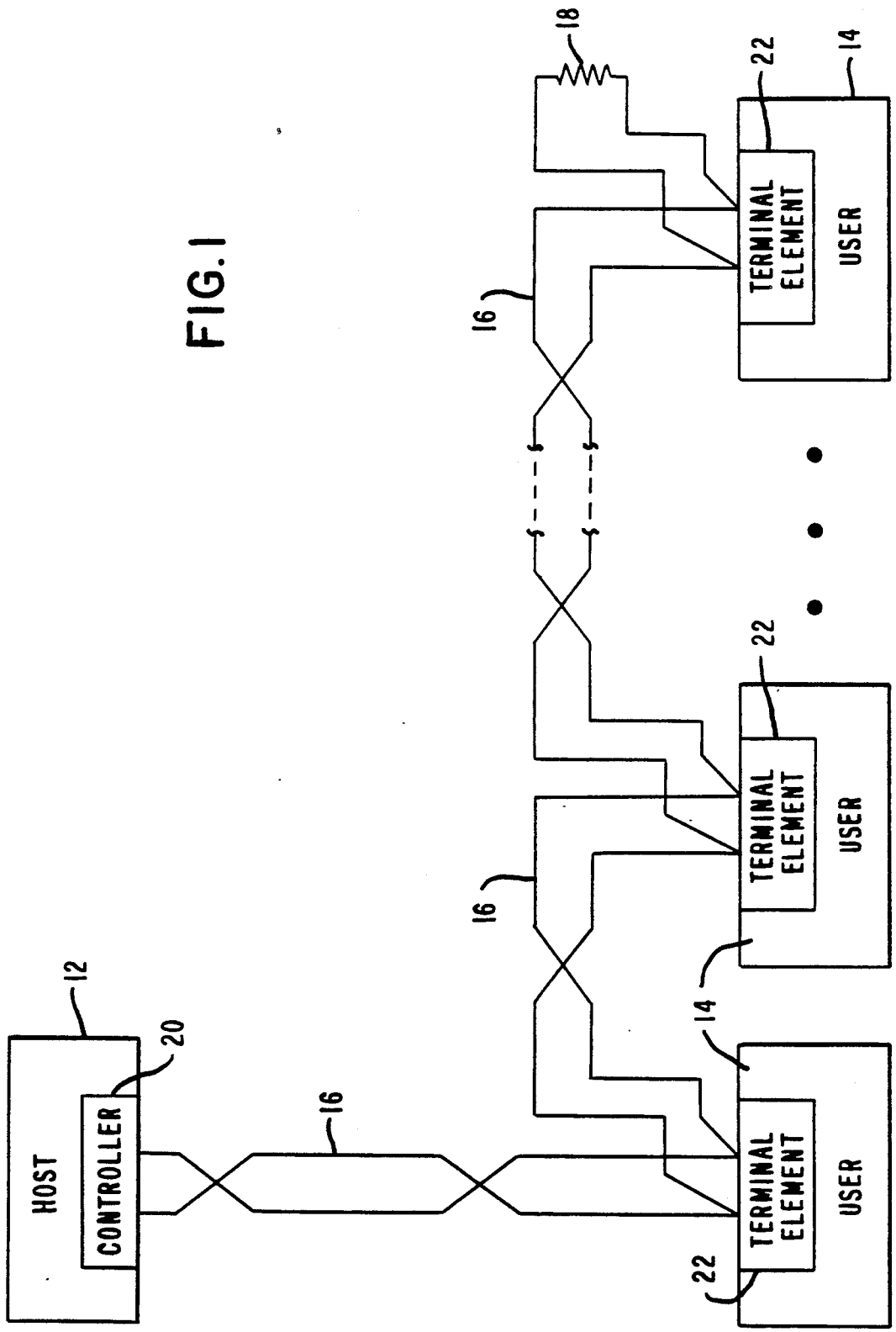

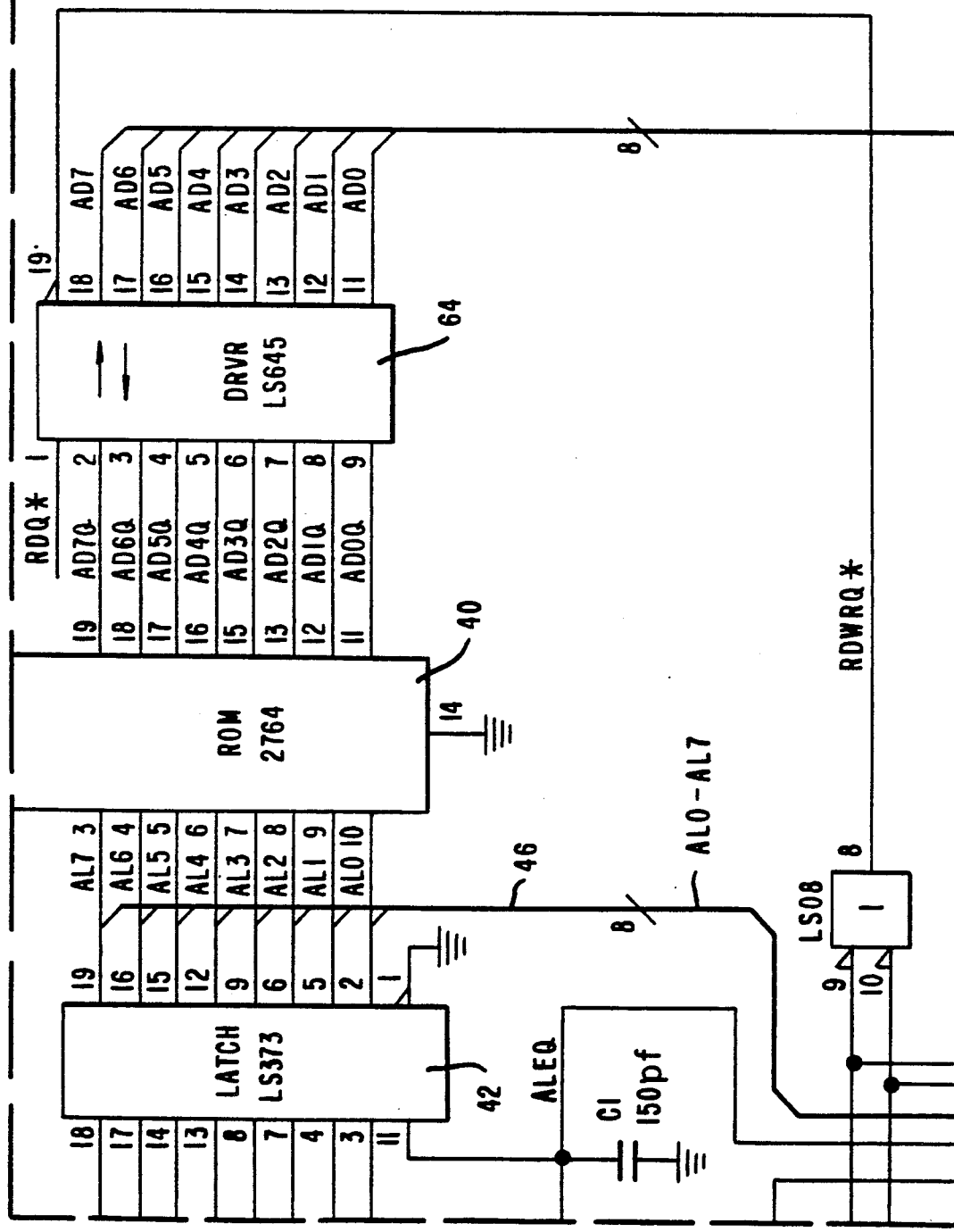

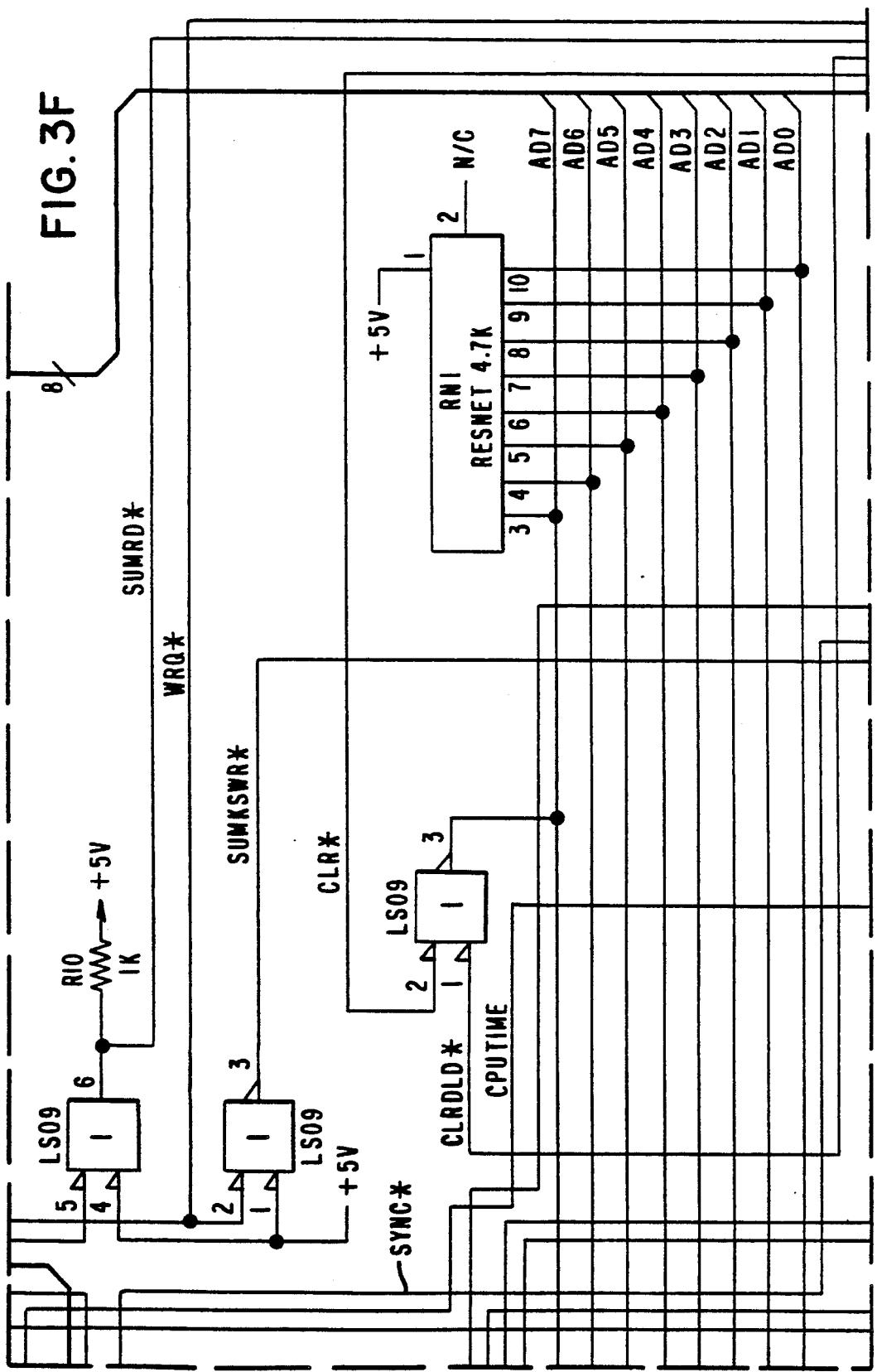

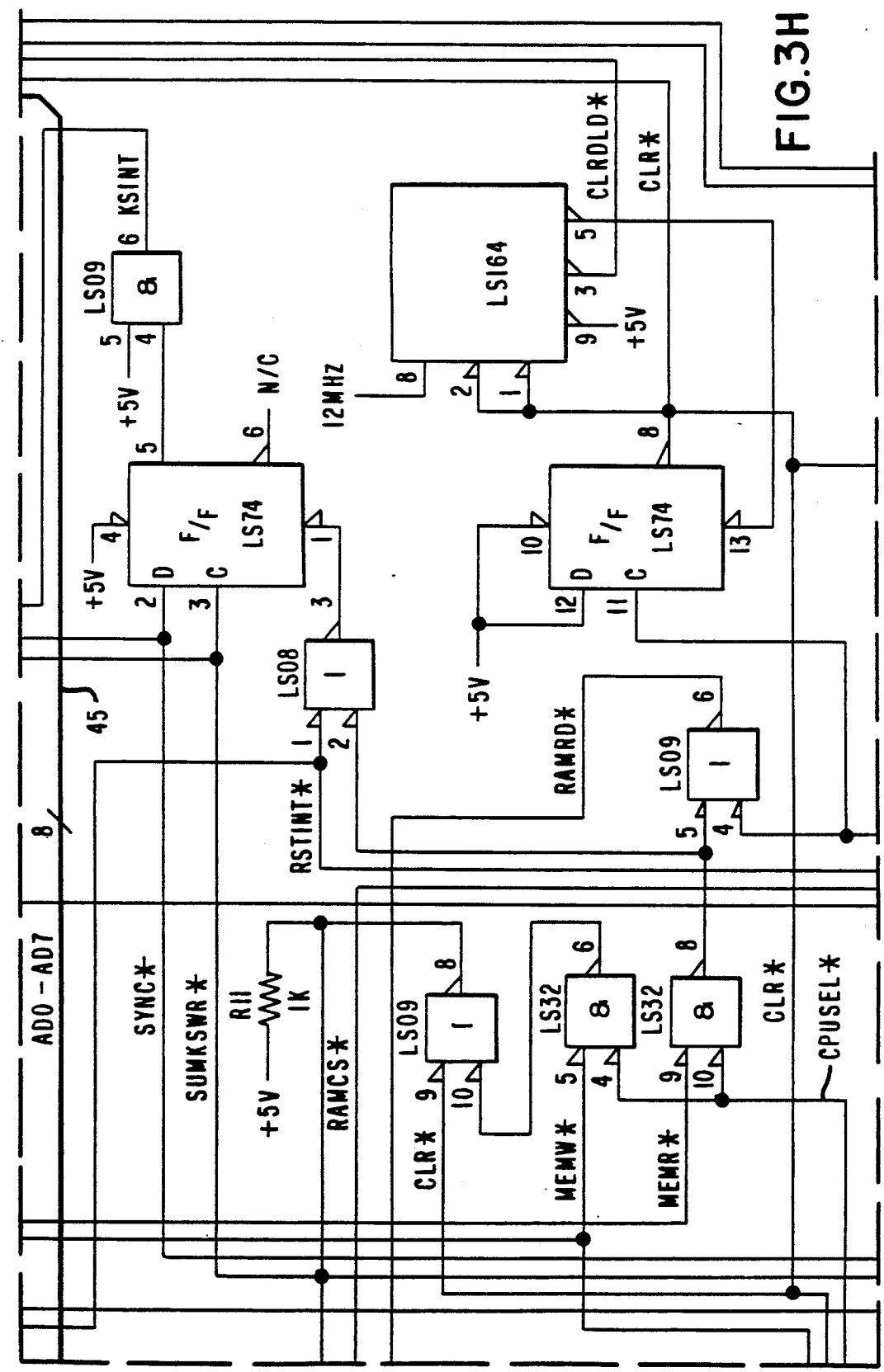

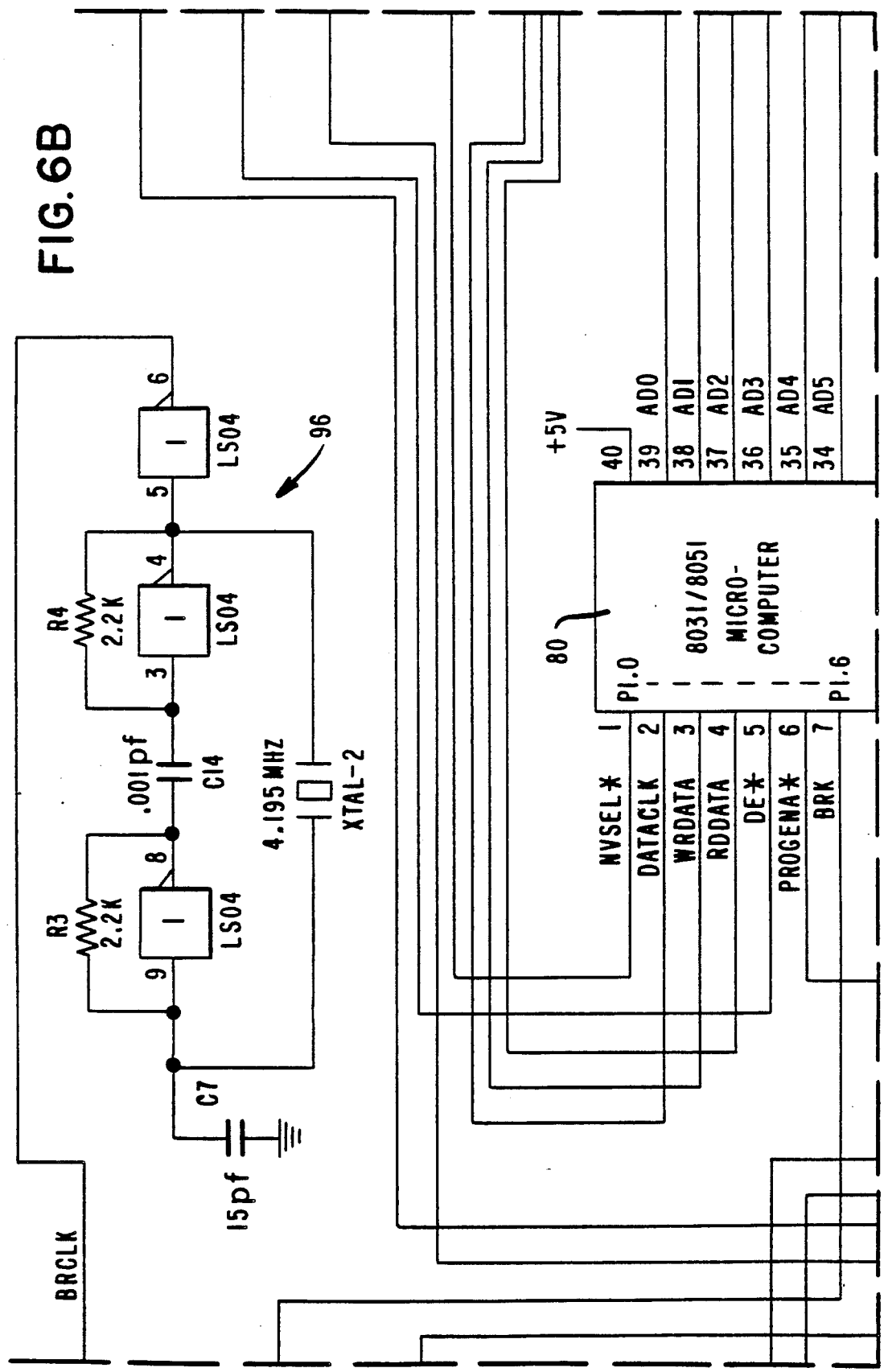

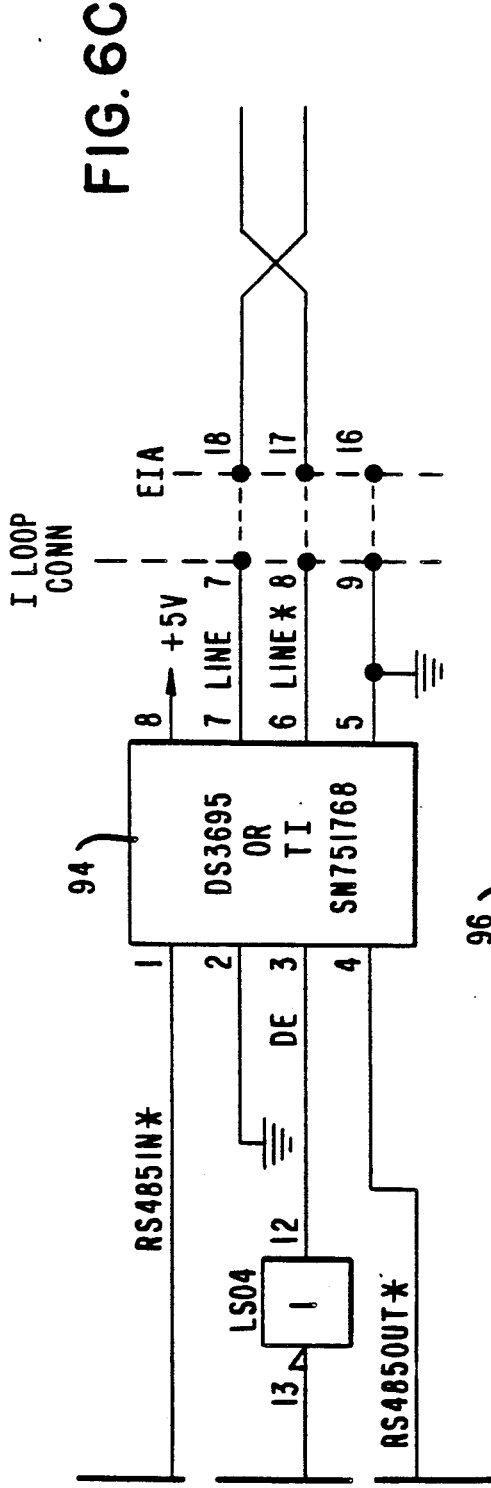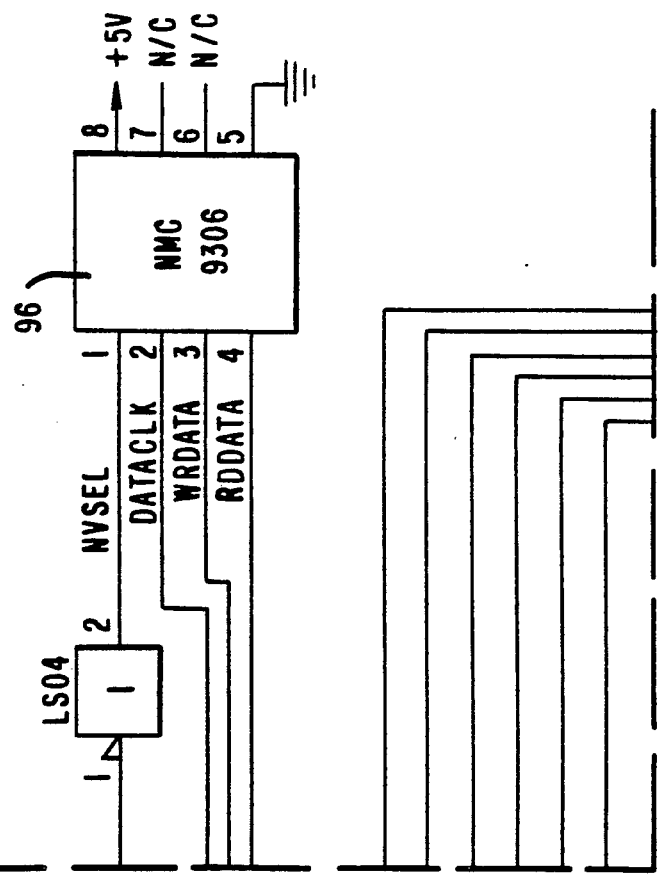

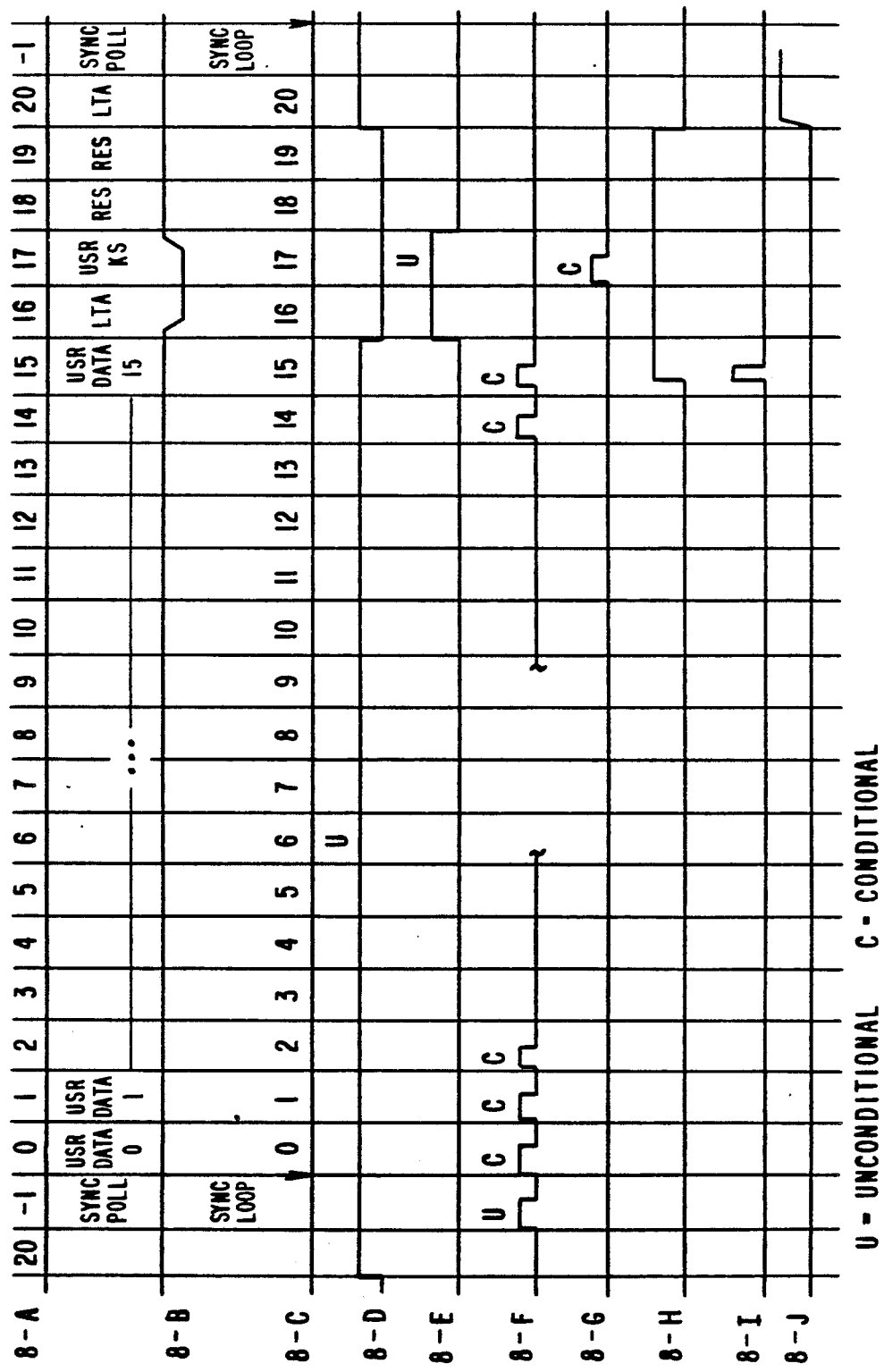

FIG. 9  TRANSMIT RAM MAP

| | P | 7 | 6 | 5 | 4 | 3 | 2 | 1 | 0 |
|---|---|---|---|---|---|---|---|---|---|
| 10-A | EVEN | 1 | 0 | 0 | 0 | ← | USER | ID | → |
| 10-B | ODD | 0 | ← | | | 7 BIT BINARY | | | → |
| 10-C | ODD | 0 | ← | | | 7 BIT BINARY | | | → |
| 10-D | EVEN | 0 | 1 | 0 | 1 | 0 | 1 | 0 | 1 |

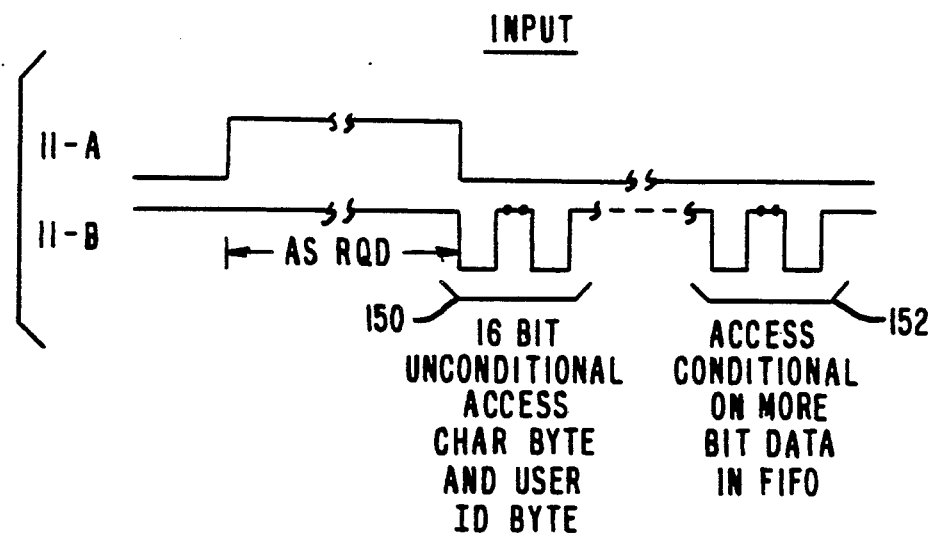
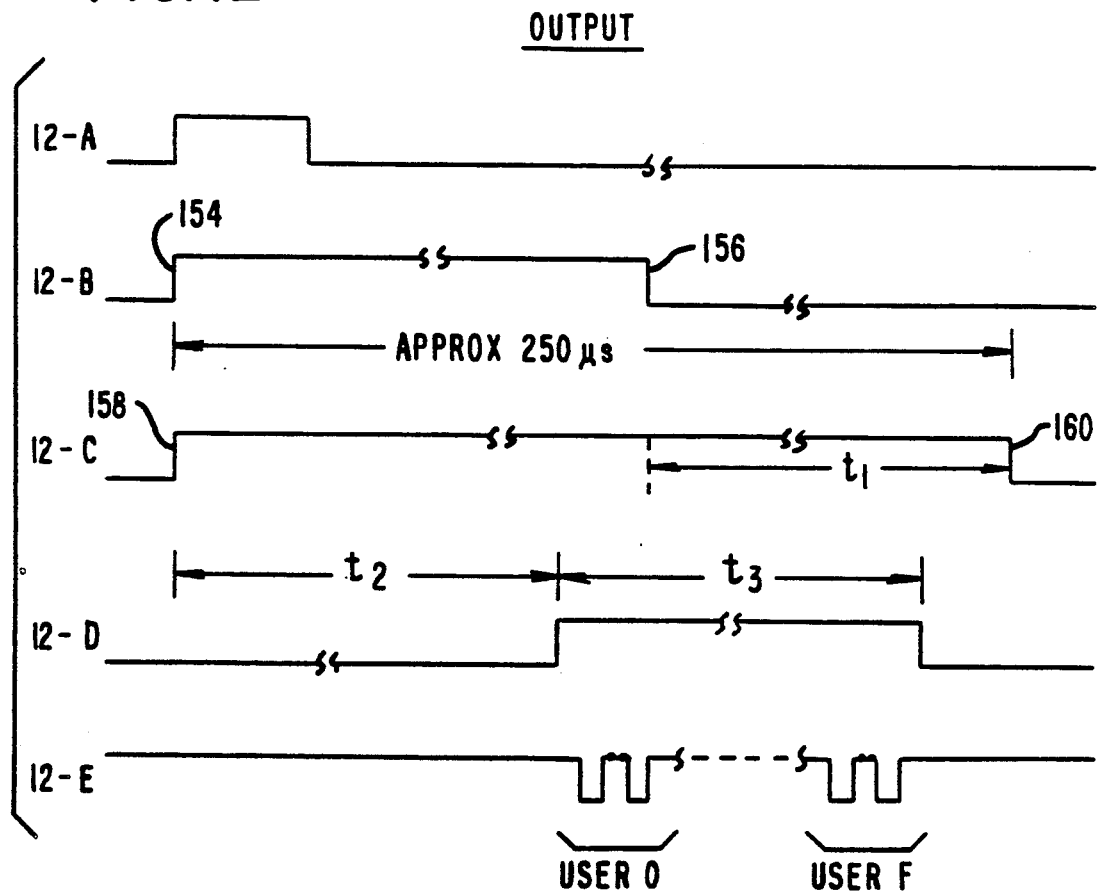

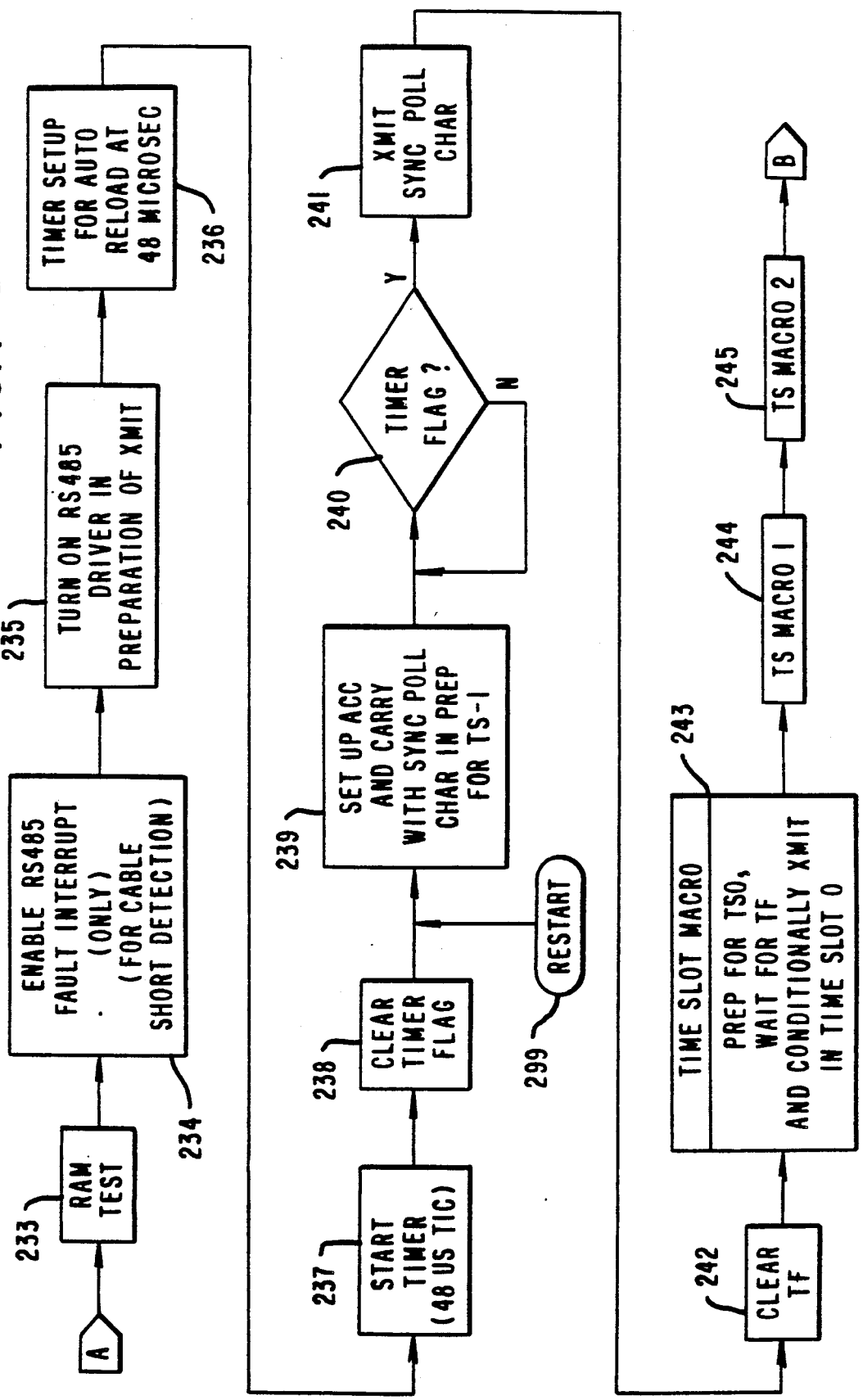

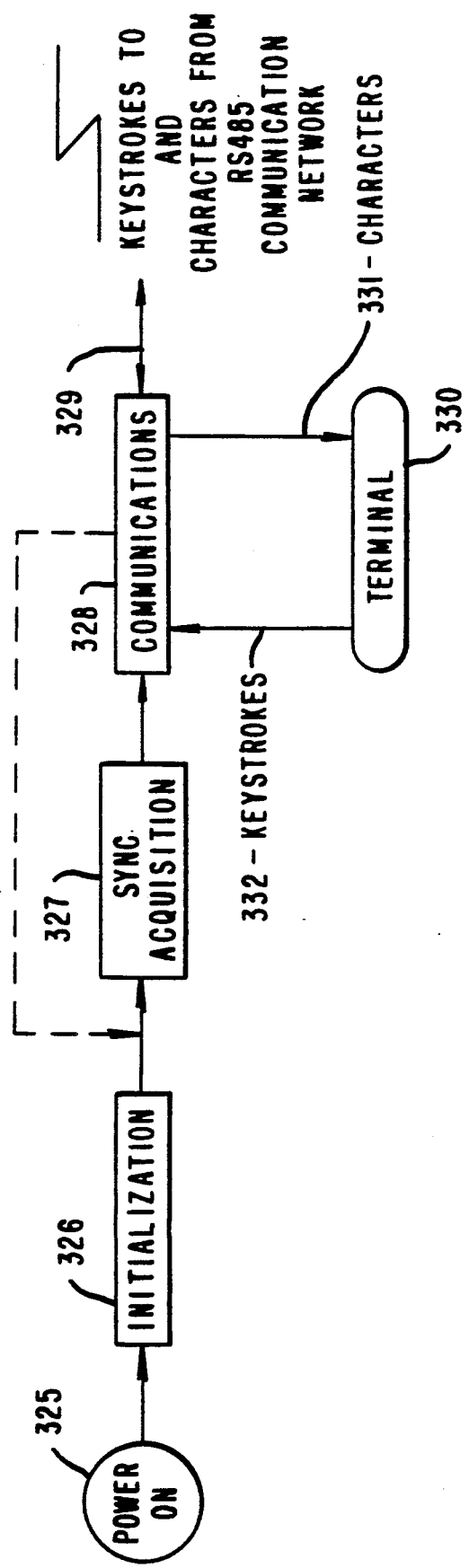

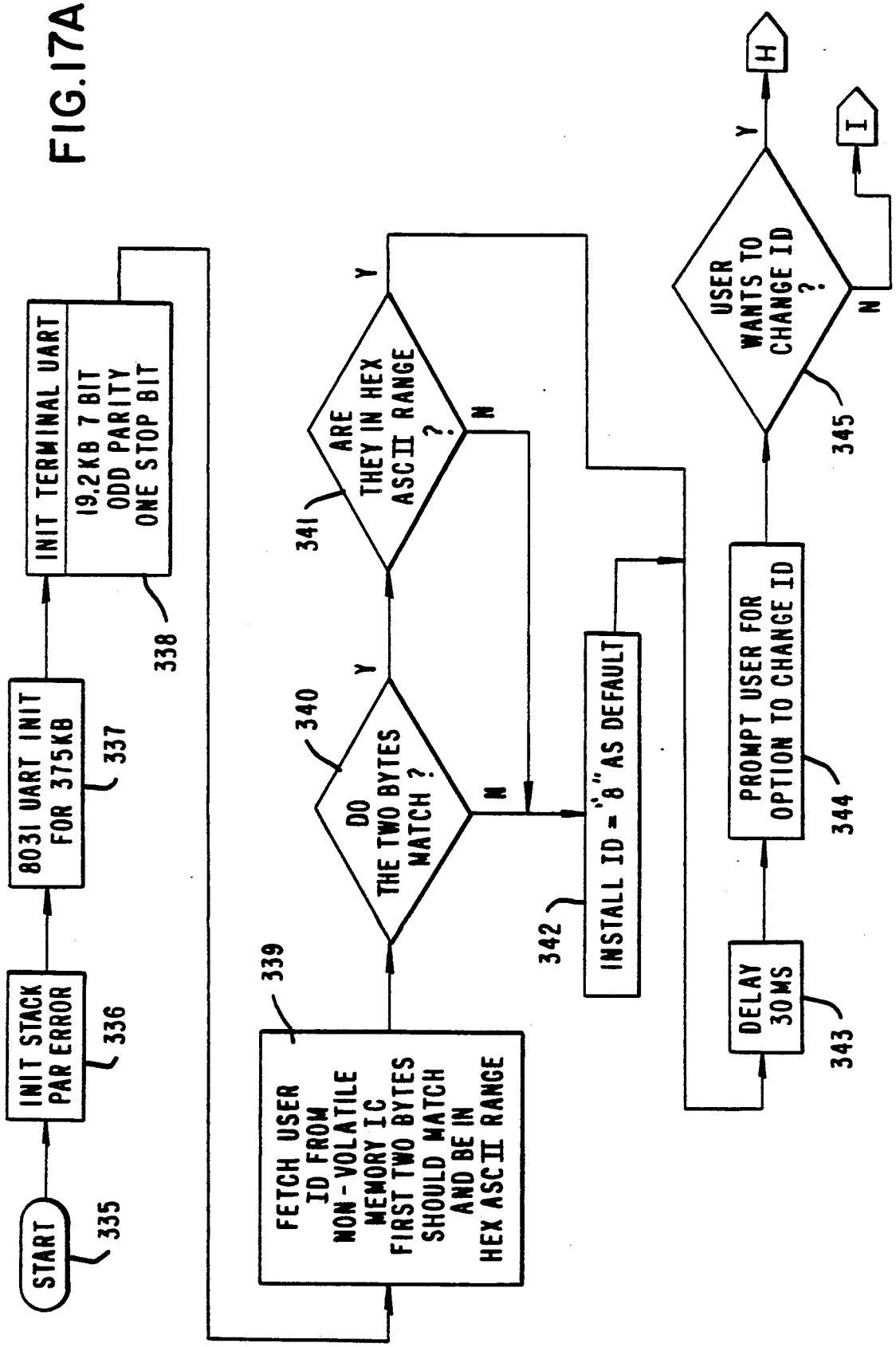

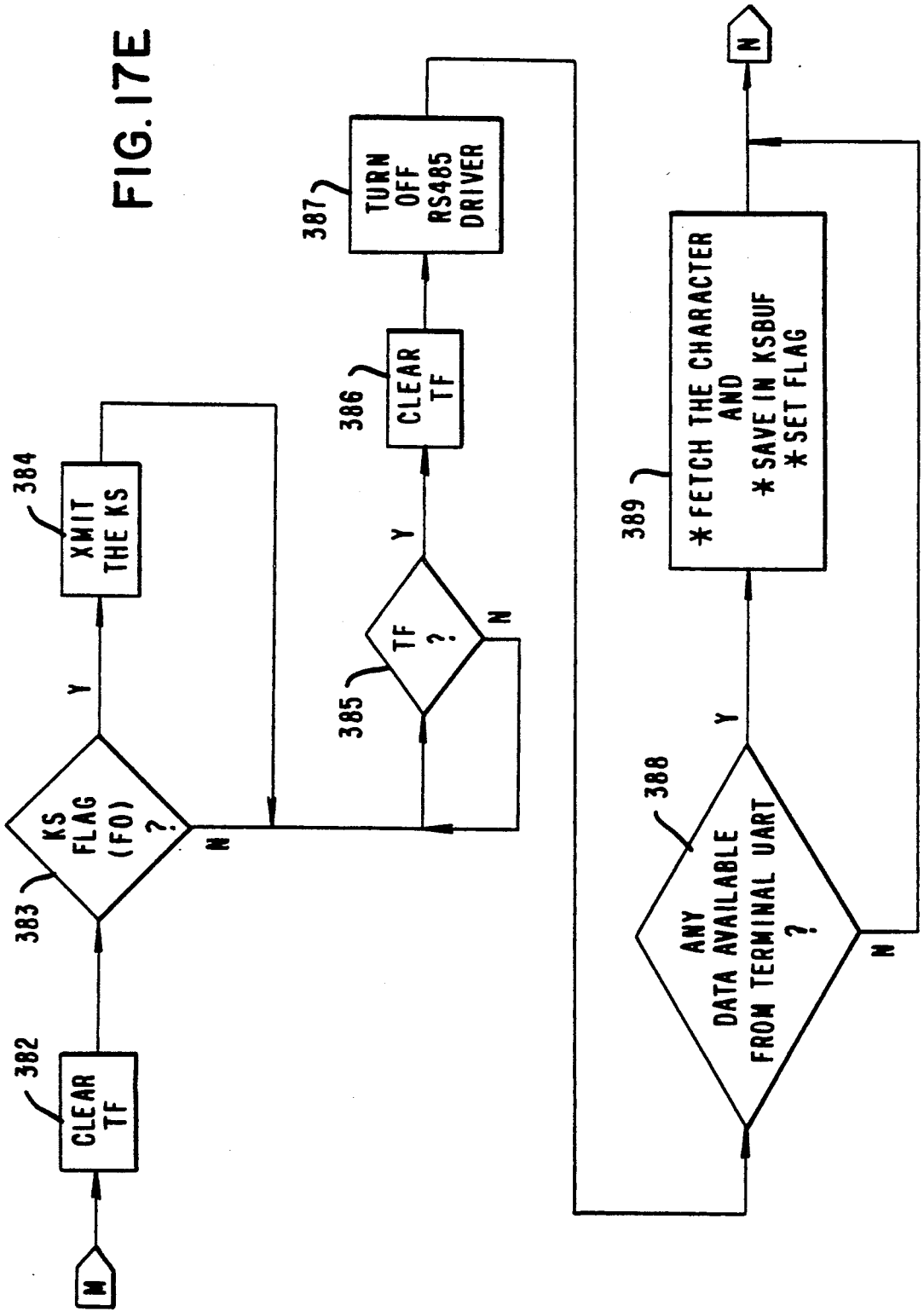

TIME SLOT PROTOCOL IN THE TRANSMISSION OF DATA IN A DATA PROCESSING NETWORK

This is a continuation of co-pending application Ser. No. 893,510 filed on Aug. 5, 1986, now abandoned.

BACKGROUND OF THE INVENTION

The present invention is related to the transmission of data between a host computer and users in a data processing system, and is more particularly related to positioned or time slot protocol transmissions in a data processing system.

Various protocol arrangements have been established for the communication of data between a host computer and a community of users in a data processing system network. One such arrangement is a time positioned or time slot protocol in which each user is assigned a time slot in a frame of data in which to send or receive data in the frame.

U.S. Pat. No. 3,784,752, to Peron, issued Jan. 8, 1974 for "Time Division Data Transmission System", discloses a telephonic data transmission system for transmission of data through a chain of cascaded, asynchronous, time-division switching networks in which a number of time slots employed for the transmission of data is variable, and is subject to the flow of information to be transmitted.

U.S. Pat. No. 3,787,631, to Lewis, issued Jan. 22, 1974 for "Time Slot Number Compensating Arrangement", discloses a telephonic data transmission system having a plurality of port circuits, with each port circuit having an individual shift register for defining the time interval during which a connection may take place. A circulating bit is used to assign a port circuit to a specific-time slot.

U.S. Pat. No. 4,161,629, to Kits van Heyningen, issued July 17, 1979 for "Communication System With Selectable Data Storage", discloses a communication system wherein a predetermined number of time slots is provided for each of sequentially occurring scans of the sending stations, with each slot providing for the transmission of a preset number of data samples. Switching circuitry and registers are employed for enabling the available time slots to be assigned to stations in accordance with the average data rate of a message.

U.S. Pat. No. 4,229,792, to Jensen et al., issued Oct. 21, 1980 for "Bus Allocation Synchronization System", discloses a bus allocation system for controlling a time division multiplexed digital data bus used by a plurality of signal sources in which no single signal source controls the bus. Each signal source has an address counter which operates in conjunction with an allocation vector. Each address counter is synchronized during or following the receipt of a message to prevent interference by more than one device using the bus at a given time.

U.S. Pat. No. 4,236,203, to Curley et al., issued Nov. 25, 1980 for "System Providing Multiple Fetch Bus Cycle Operation", discloses a data communications system wherein information may be transferred by the requesting unit having the highest priority during an asynchronously generated bus transfer cycle. Logic is provided for enabling a master unit to request information from a slave unit during a first bus transfer cycle, wherein the information from the slave unit is transferred from the slave unit during a series of later slave generated bus cycles.

U.S. Pat. No. 4,241,444, to Kister, issued Dec. 23, 1980 for "Arrangement for Time-Division Multiplex PWM Data Transmission", discloses a time-division multiplex data transmission system in which each subscriber on the system has a programmable counter which can be reset synchronously with the programmable counters of the other subscribers for determining the end of a time frame.

U.S. Pat. No. 4,340,961, to Copel et al., issued July 20, 1982 for "Distributed Multi-Port Communications System", discloses a distributed multi-port communications system wherein terminals may communicate with one another during sequential poll cycles to fulfill low data rate requirements, or during a burst cycle to fulfill high data rate requirements. Each poll cycle includes a number of time slots with at least one time slot assigned to each terminal during which it can transmit data to any other terminal or request for a burst cycle.

U.S. Pat. No. 4,535,446, to Mountain, issued Aug. 13, 1985 for "Digital Transmission Systems", discloses an aligner which can operate as a time switch to avoid clashes between reading and writing to a store by allowing slippage of one frame.

SUMMARY OF THE INVENTION

In a specific embodiment, the invention comprises a data processing network having a host computer, a plurality of terminals, each terminal having an assigned identification, a cable for transmitting data between the host computer and the plurality of terminals, and a controller connected to the host computer and the cable. The controller receives character data from the host computer and places the character data on the cable for transmission to the plurality of terminals. Keystroke data is received by the controller from each of the terminals over the cable and transmitted to the host computer. Each of the terminals has a terminal element circuit connected to the cable. Each of the terminal element circuits receives character data transmitted from the host computer over the cable, and receives keystroke data from its associated terminal for transmission over the cable to the host computer. The controller has a circuit for transmitting a cycle of time frames, with each time frame having a plurality of time slots. One time slot is allocated for sending a single character to an associated terminal, and each time frame further has a time slot for transmission of a single keystroke from a specified terminal to the host computer.

An object of the present invention is to provide a communication system wherein data is sent between a plurality of users and a host computer in a cycle of time frames, with each time frame divided into a plurality of time slots in each time frame for receiving a data character from the host computer, and each time frame having one time slot wherein keystroke data is sent from one designated user to the host computer.

It is another object of the present invention to provide a communication system wherein data is sent between a plurality of users and a host computer in a cycle of time frames, wherein each time frame is started by a sync/poll character generated in response to a master clock in a controller in the host computer, and each user includes a clock responsive to the receipt of the sync/poll character from the host computer for synchronizing the operations of all of the users.

It is another object of the present invention to provide a communication system wherein data is sent between a plurality of users and a host computer in a cycle of time frames, wherein each time frame starts with a sync/poll character which includes the identification of a user which may transmit one character of keystroke data to the host computer during the time frame.

It is another object of the present invention to provide a communications system for transmitting character data from a host computer having a controller with a memory for storing character data to be transmitted, to a plurality of users in a cycle of time frames, with each time frame divided into a plurality of time slots. Character data to be transmitted to the users are written into the controller memory by the host computer during a specified time slot, and are read out of the controller memory by the controller for transmission to the users during other specified time slots so that there is no clash between writing and reading operations of the controller memory.

These and other objects of the present invention will become apparent from the description of the preferred embodiment and the drawings herein.

BRIEF DESCRIPTION OF THE DRAWINGS

FIG. 1 is a diagrammatic representation of a communications network utilizing the present invention;

FIGS. 3A-3K, arranged as shown in the map of FIG. 4, form a schematic diagram of the communication controller of FIGS. 2A-2B;

FIGS. 6A-6F, arranged as shown in the map of FIG. 7, form a schematic diagram of the terminal element circuit of FIG. 5;

FIG. 8 is a timing diagram for the network of FIG. 1;

FIG. 9 is a memory map of character data stored in a RAM of FIG. 2;

FIG. 11 is a timing diagram of a FIFO device in the communications controller of FIGS. 2A-2B;

FIG. 12 is a timing diagram of the timing for the writing of character data to the memory of the RAM as illustrated in FIG. 9;

FIGS. 14A-14F is a flow chart of the program of FIG. 13;

FIG. 16 is an overall flow chart of a program for use by a microcomputer in the terminal element of FIG. 5;

FIGS. 17A-17F is a flow chart of the program of FIG. 16; and

DESCRIPTION OF THE PREFERRED EMBODIMENT

Figure 2A:
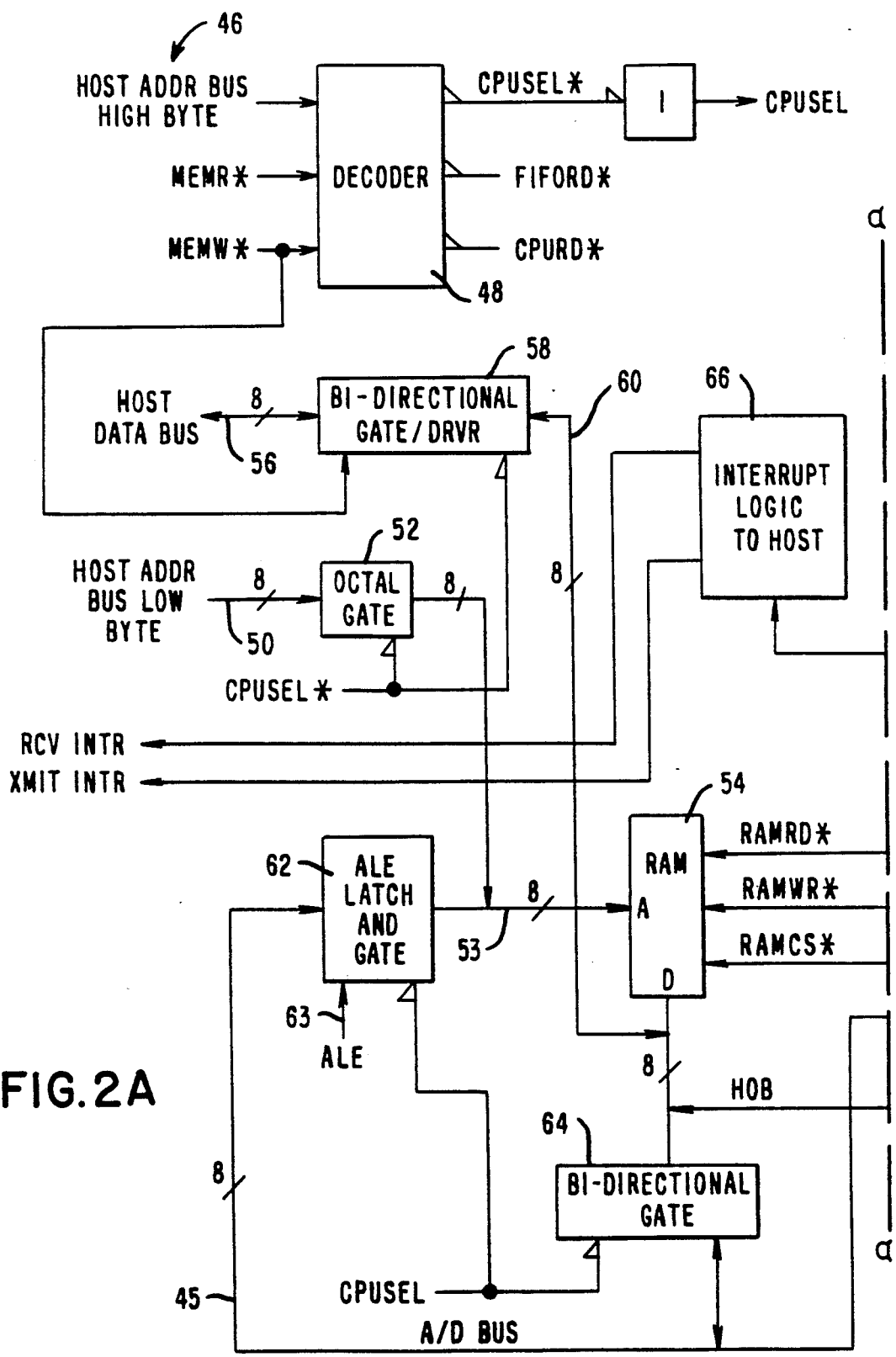
FIGS. 2A and 2B, connected along line a—a, form a functional block diagram of a communication controller of the network of FIG. 1.

FIG. 1 is a diagrammatic representation of a communications network utilizing the present invention. The network includes a host computer 12, and a plurality of users 14. The maximum number of users 14 of the present example is sixteen, however the number of users may be increased if clock rates are increased for the data and for the microcomputer.

The host computer 12 communicates with the users 14 over a 120 ohm characteristic impedance twisted pair shielded cable 16 which is daisy chained between the users 14. A 120 ohm line termination resistor 18 is provided at the last user, as is known. The maximum length for the cable 16 is about four thousand feet. The host computer 12 has a controller 20 connected to its back plane (not shown) for providing communication between the host 12 and the community of users 14. Each user 14 includes a terminal element 22 for providing communications between itself and the host computer 12. In the present configuration, it is contemplated that each user 14 will communicate only with the host 12, but since each user 14 receives all of the communications sent over the cable 16, commands from the host 12 could be established telling a first user 14 that all messages from a designated second user 14 are to be received by the first user. In this way, communication between users can be established.

A host computer 12 may be an IBM PC, an IBM PC AT personal computer, an NCR PC 8 personal computer, or any computer device capable of providing data for transmission to the controller and capable of receiving user data from the controller. The users 14 may be one of the VP+E, VP60+, or 3,220 data terminals available from ADDS, Hauppauge, N.Y., or a 7930 data terminal available from the NCR Corporation, Dayton, Ohio. The terminal element 22, of each user 14, may be an external unit which communicates with the terminal via a standard 25 pin EIA connector or may be located internal to the terminal of the user 14. For an external configuration, the terminal can be any standard ASCII terminal.

Figure 2B:
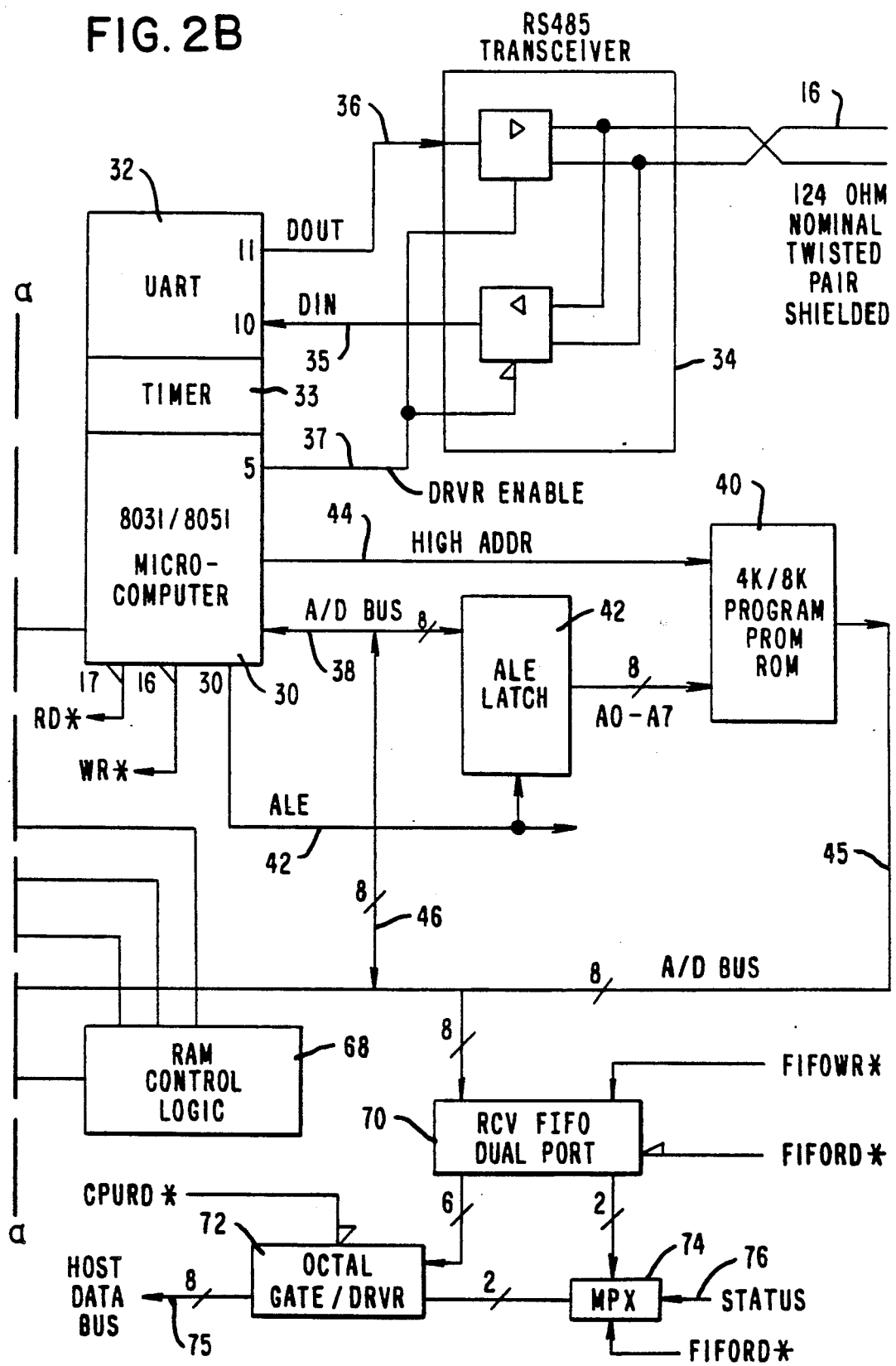
Figure 3A:
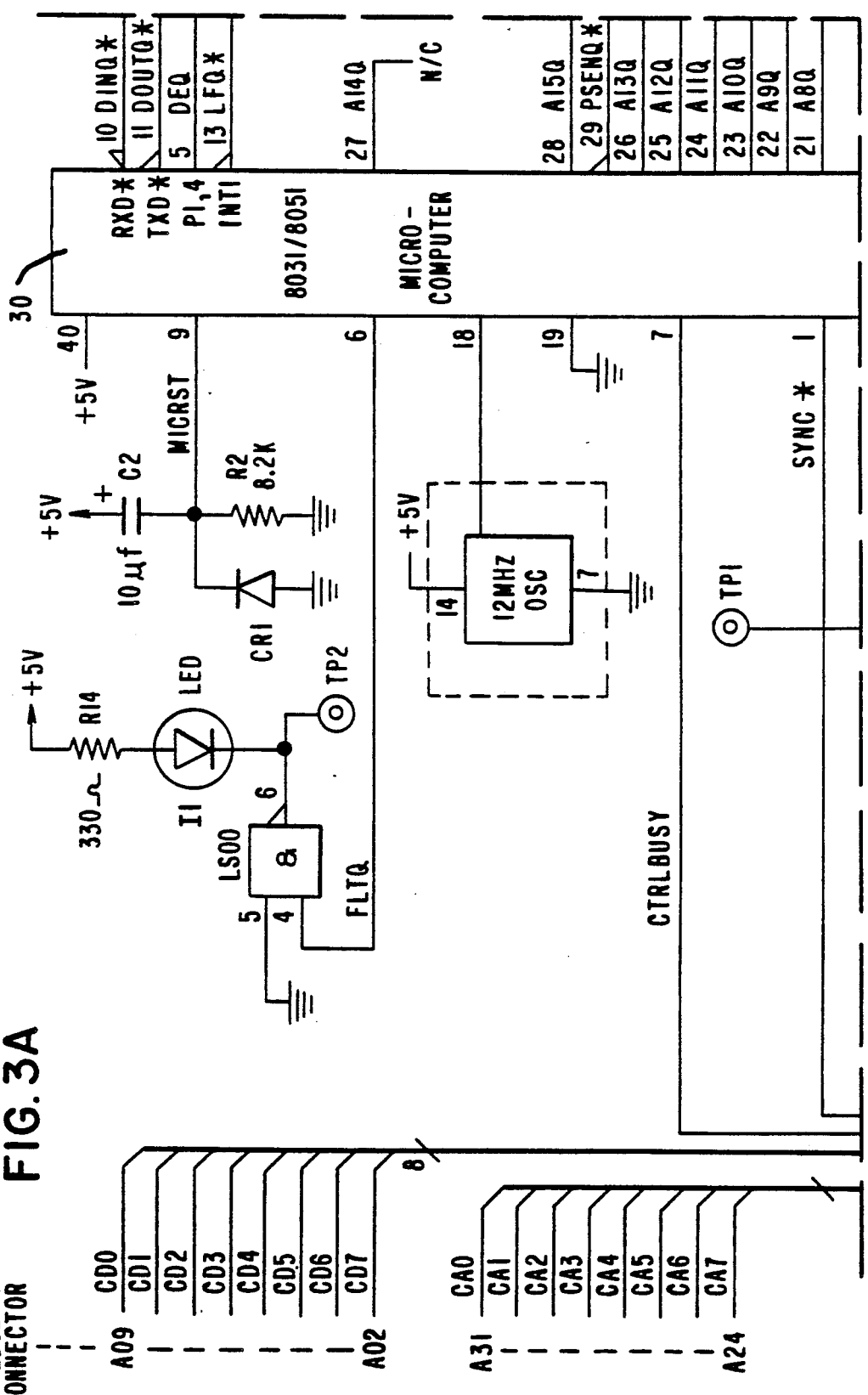

FIGS. 2A and 2B, connected along line a—a, form a functional block diagram of the communications controller 20 of FIG. 1. The controller 20 includes an 8031 microcomputer 30, available from Intel Corporation, and is fully explained in the publication "An Introduction to the Intel ® MCS-51 ™ Single-Chip Microcomputer Family" by John Wharton, Intel Corporation, 1980.

The microcomputer 30 includes an internal universal asynchronous receiver-transmitter (UART) 32 for reading serial data from the twisted pair cable 16 via an RS485 transceiver 34 over a DIN conductor 35, or writing data to the twisted pair cable 16 via the RS485 transceiver 34 via a DOUT conductor 36. The microcomputer 30 also includes a timer 33 which is programmed to act as a master timer for formatting the transmission of data between the controller 20 and the users 14, as will be explained. The transceiver 34 may be a NATL DS 3696 device. The direction of the data transmitted between the UART 32 and the cable 16 is controlled by the DRVR ENABLE signal on conductor 37 from pin 5 of the microcomputer 30.

The microcomputer 30 is connected to an eight bit address/data (A/D) bus 38 over which the low order byte of an address is transmitted, and over which data may either be read to or written from the microcomputer 30. A programmable PROM or ROM (referred to herein as a ROM) 40 is provided to store programming for the microcomputer 30, as will be explained. An address latch enable latch 42 is provided to latch the low byte from the A/D bus 38, and is controlled by the address latch enable (ALE) signal on conductor 63 from pin 30 of the microcomputer 30. The high byte of the ROM address is transmitted from the microcomputer 30 to the ROM 40 over a high address bus 44. As is known, when an instruction is to be fetched from the ROM 40, its low byte address is placed on the A/D bus 38, and its high byte address is placed on the high address bus 44. The ALE signal latches the low address byte in latch 42. Fetch instruction data is then outputted by the ROM 40 on the A/D bus 45, which places the instruction data on the A/D bus 38 via bus extension 46. If the programming is kept to less than four thousand bytes, an 8051 microcomputer may be used which has a four thousand byte program memory onboard the microcomputer chip. In that case, the ROM 40 and latch 42 may be eliminated.

As will be explained, character data may be sent from the host computer 12 to each user 14, and keystroke data may be sent from each user 14 to the host computer 12. The controller 20 has two separate data paths, a transmit path for transmitting characters from the host computer 12 to the users 14, and a receive path for receiving keystrokes from the users 14 to the host computer 12.

The transmit path includes a connection (not shown) to the host address bus in the back plane of the host computer 12. This connection includes a host address high byte bus 46 over which control instructions and the memory read (MEMR*) and memory write (MEMW*) signals from the host computer 12 are sent to a decoder circuit 48, and an eight bit host address low byte bus 50 over which addresses are sent via an octal gate 52 and an address bus 53 to the address terminals of a random access memory device (RAM) 54. An alternate configuration (not shown) for latch element 62 and RAM element 54 is the use of a dual ported FIFO which frees the host computer of the requirement to output data for transmitting only during a relatively narrow time interval provided by the 8031 microcomputer 30 for this function. An eight bit host data bus 56 is connected to the host data bus (not shown) in the back plane of a host computer 12, and is further connected to a bi-directional gate/driver device 58. An eight bit bus 60 is connected between the bi-directional gate/driver 58 and the data terminals of the RAM 54. An ALE latch and gate device 62 has its inputs connected to the A/D bus 45, and its outputs connected to the address bus 53. The latch portion of the device 62 is controlled by the ALE signal on conductor 63 from pin 30 of the microcomputer 30, and the gate portion of the device 62 is controlled by the CPU select (CPUSEL) signal, to be discussed. Also controlled by the CPUSEL signal, is a bi-directional gate 64 for passing data between the data terminals of the RAM 54 and the A/D bus 45.

To transmit characters from the host computer 12 to the users 14, the host computer 12 passes the data on host data bus 56 to RAM 54 via gate 58 and bus 60 at the address reserved for the desired user to the RAM 54 via bus 50, gate 52, and the bus 53. The microcomputer 30 then sequentially reads characters stored in the RAM 54 by means of the ALE latch and gate device 62 and gate 64, and outputs each character read from the RAM 54 in a time positioned sequence, to be discussed, on the twisted pair cable 16 via conductor 36 and RS 485 transceiver 34. After the microcomputer 30 has sent the characters in the RAM 54 to the users 14 in the time sequence to be described, a transmit interrupt (XMIT INTR) signal is unconditionally enabled by an interrupt logic circuit 66. The XMIT INTR signal starts the CPU TIME signal, during which time, access to the RAM 54 is given to the host computer 12 for storing characters to be sent to the users 14.

A RAM control logic circuit 68 is provided to check the validity of each character read from the RAM 54 before it is transmitted by the microcomputer 30 to the users 14. If the high order bit has been cleared, the character is not transmitted. After a character has been fetched from the RAM 54 by the microcomputer 30, its high order bit is cleared by the RAM control logic 68, and the cleared high order bit is read back into the RAM 54, such that that character will not be again transmitted by the micro-computer 30. Thus, a new character must be written at that location in the RAM 54 by the host computer 12 in order for the new character to be transmitted by the microcomputer 30 to the users 14.

The receive path for keystrokes from the users 14 to the host computer 12 includes the twisted pair cable 16, the RS485 transceiver 34 and the DIN conductor 35. The keystroke data and an identification (ID) of the user sending the keystroke is outputted by the microcomputer 30 over the A/D buses 38 and 46 to a dual ported receive first-in-first-out (RCV FIFO) device 70. The RCV FIFO 70 is loaded when the WR* signal of the microcomputer 30 is active. When data is sent to the RCV FIFO 70, the microcomputer 30 instructs the interrupt logic 66 to enable the receive interrupt (RCV INTR) signal to tell the host computer 12 that data has been stored in the RCV-FIFO 70. When the host computer 12 is ready to read the RCV FIFO 70, an appropriate command is sent to the decoder 48. In response to this command, the FIFORD* and CPURD* signals are made active. The FIFORD* signal unloads keystroke data from the RCV FIFO 70 to an octal gate/driver 72 via a multiplexer 74, also controlled by the FIFORD* signal. The gate/driver device 72 controlled by the CPURD* signal, gates the keystroke data onto a host data bus 75, which is connected to the host data bus (not shown) in the back plane of the host computer 12.

If status bits are to be read by the host computer 12, an appropriate command is sent to the decoder 48. In response to this command, only the CPURD* signal is made active. In this case, status bits on bus 76 are passed by multiplexer 74 and gated by the gate/driver device 72 onto the host data bus 75. This allows status bits to be passed from the microcomputer 30 to the host computer 12 without first having to be stored in the RCV FIFO 70.

Figure 4:
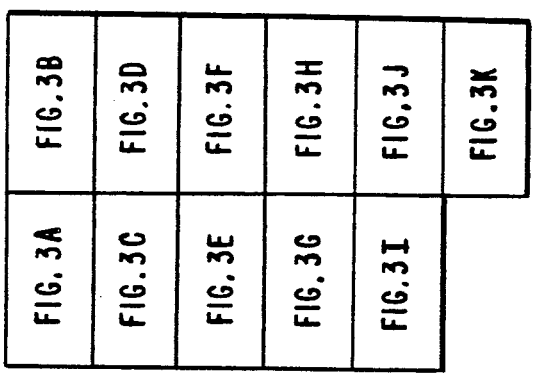
Figure 3B:
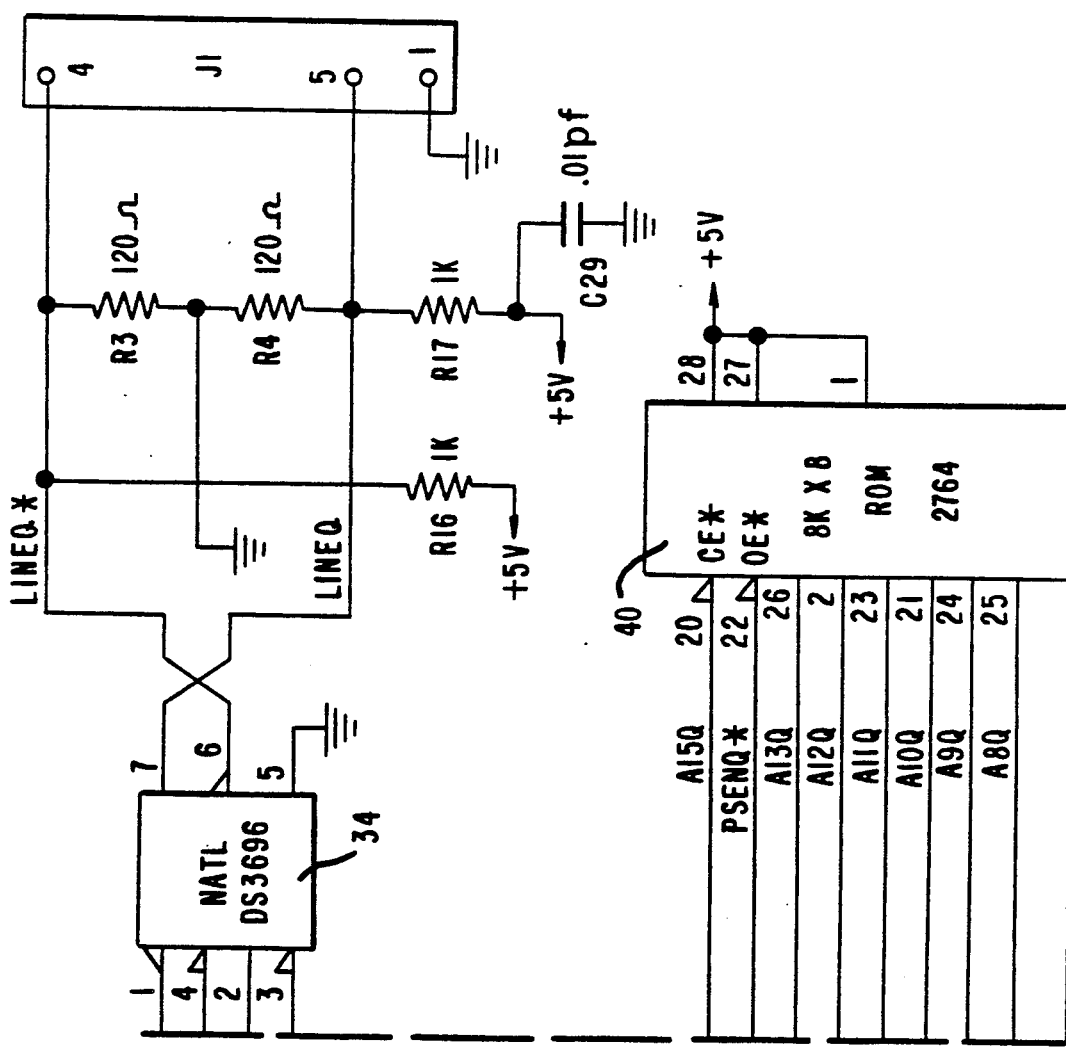
Figure 3C:
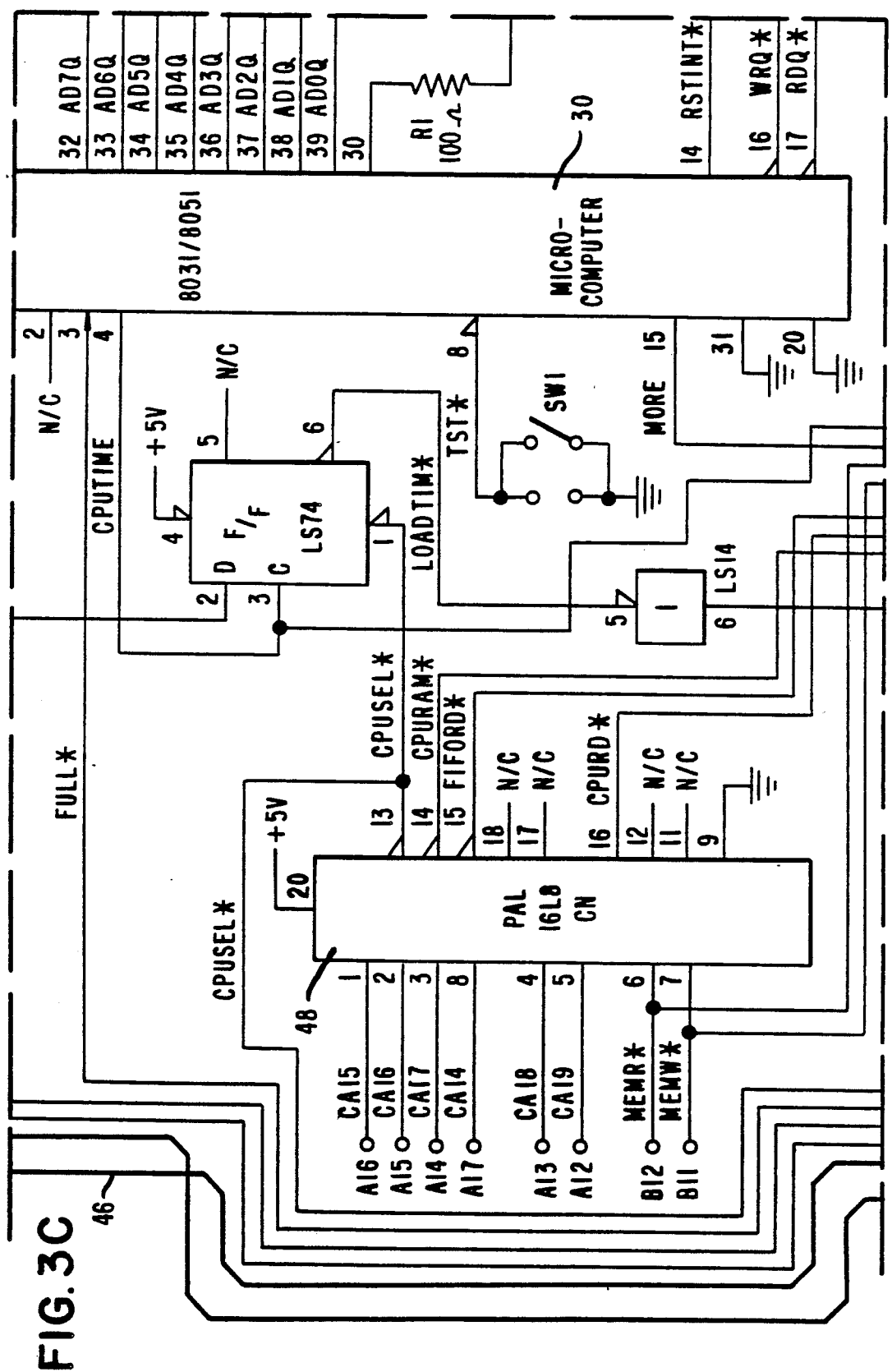
Figure 3E:
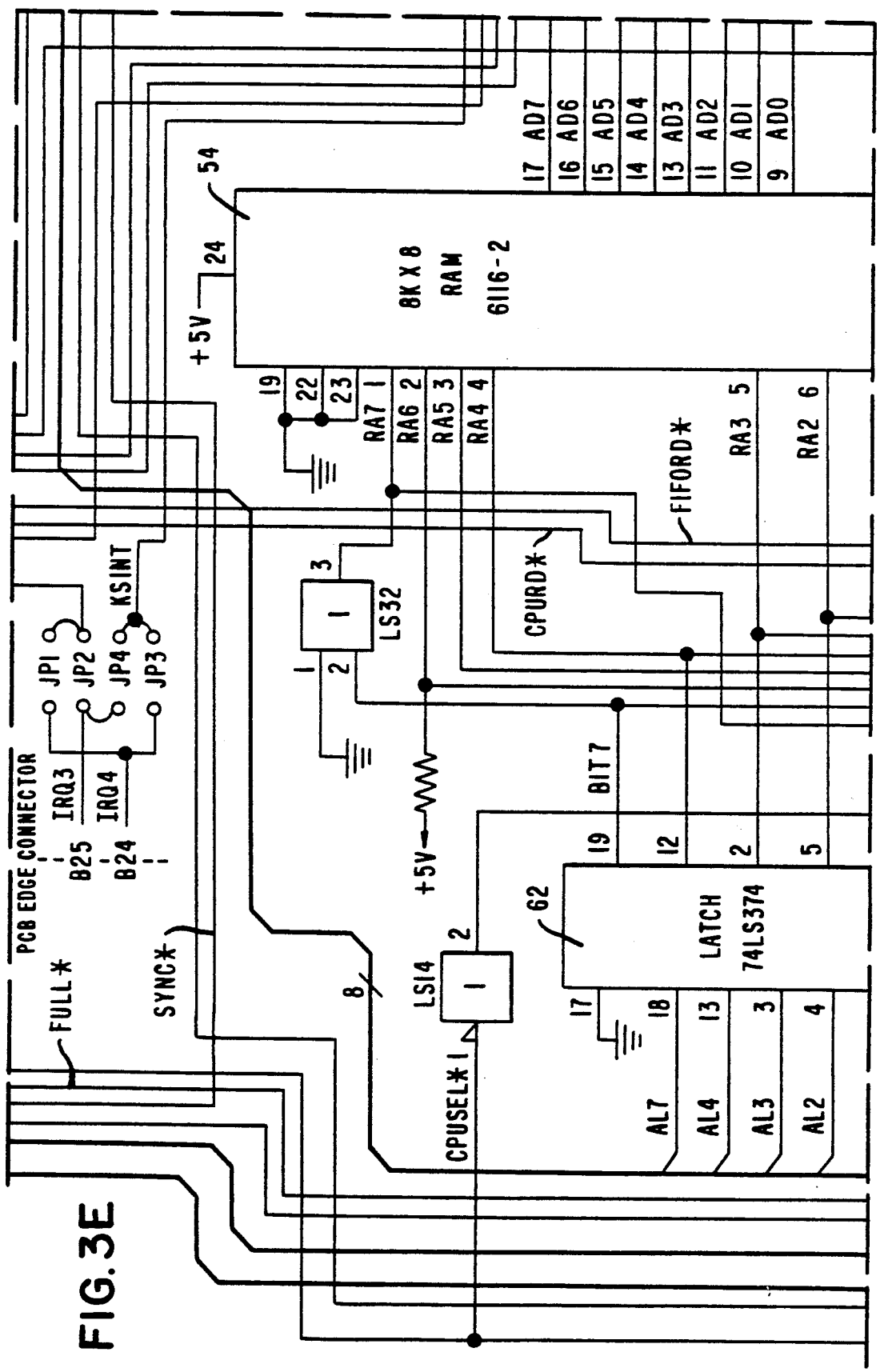
Figure 3G:
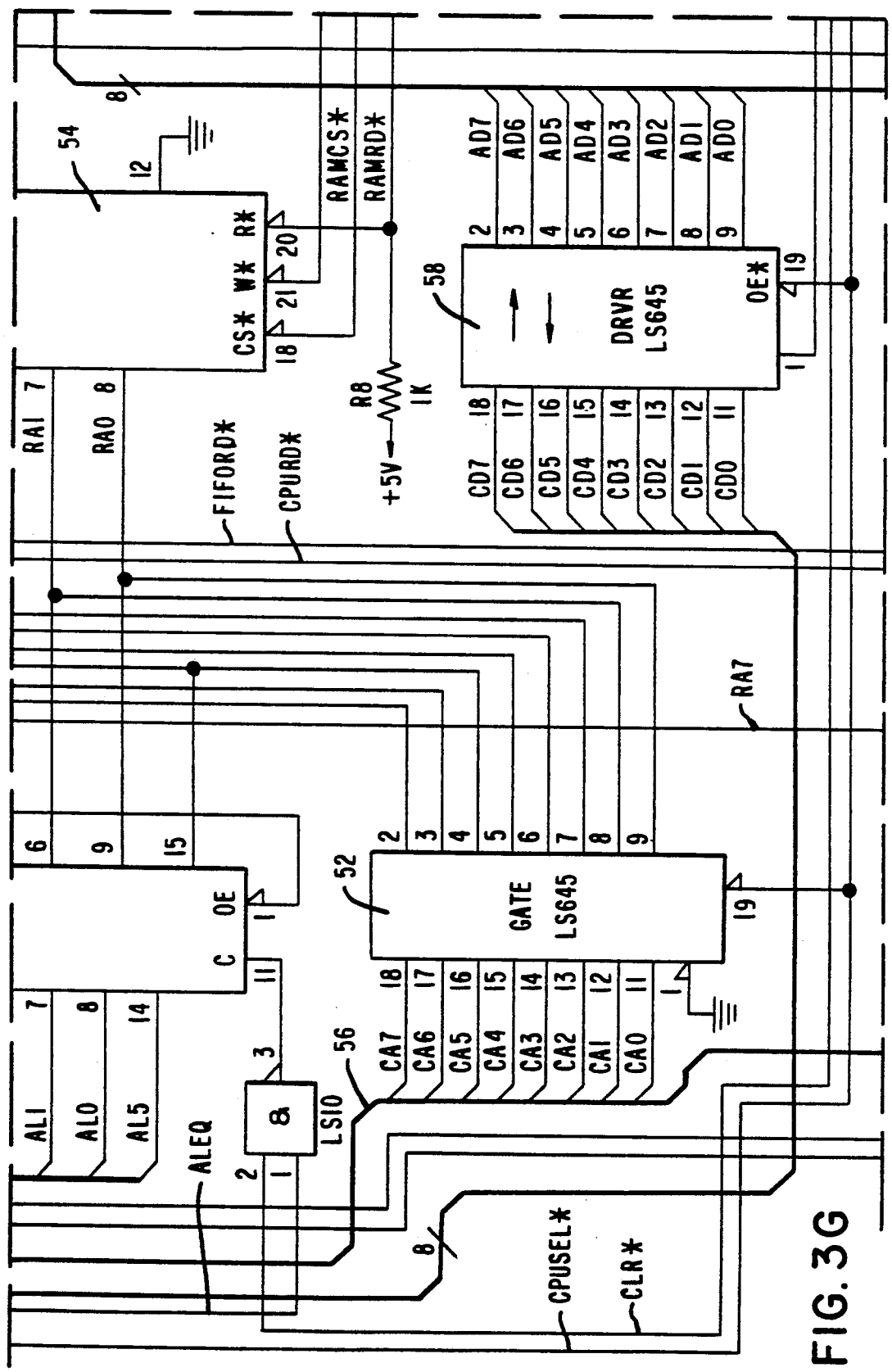
Figure 3I:
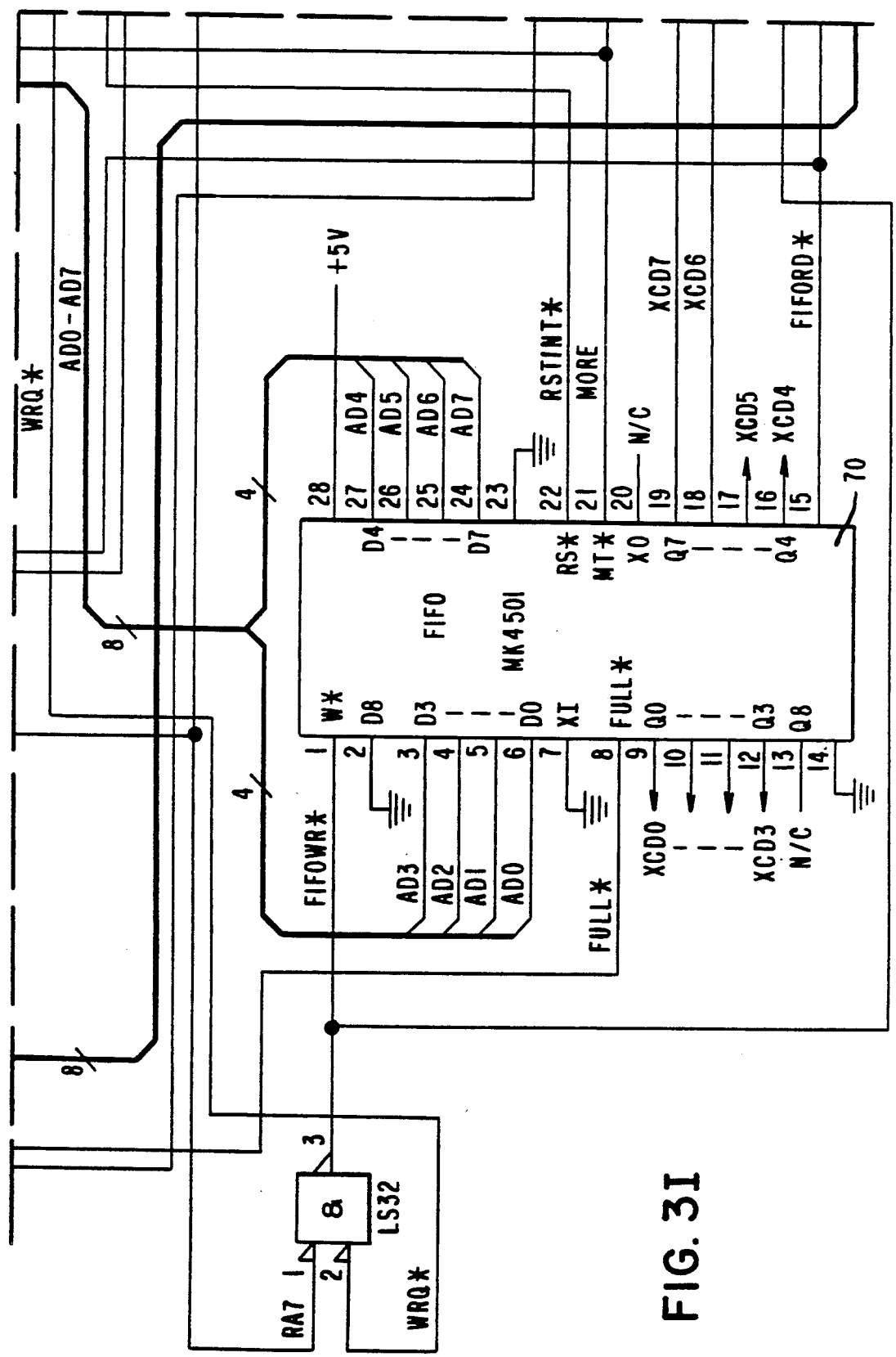
Figure 3J:
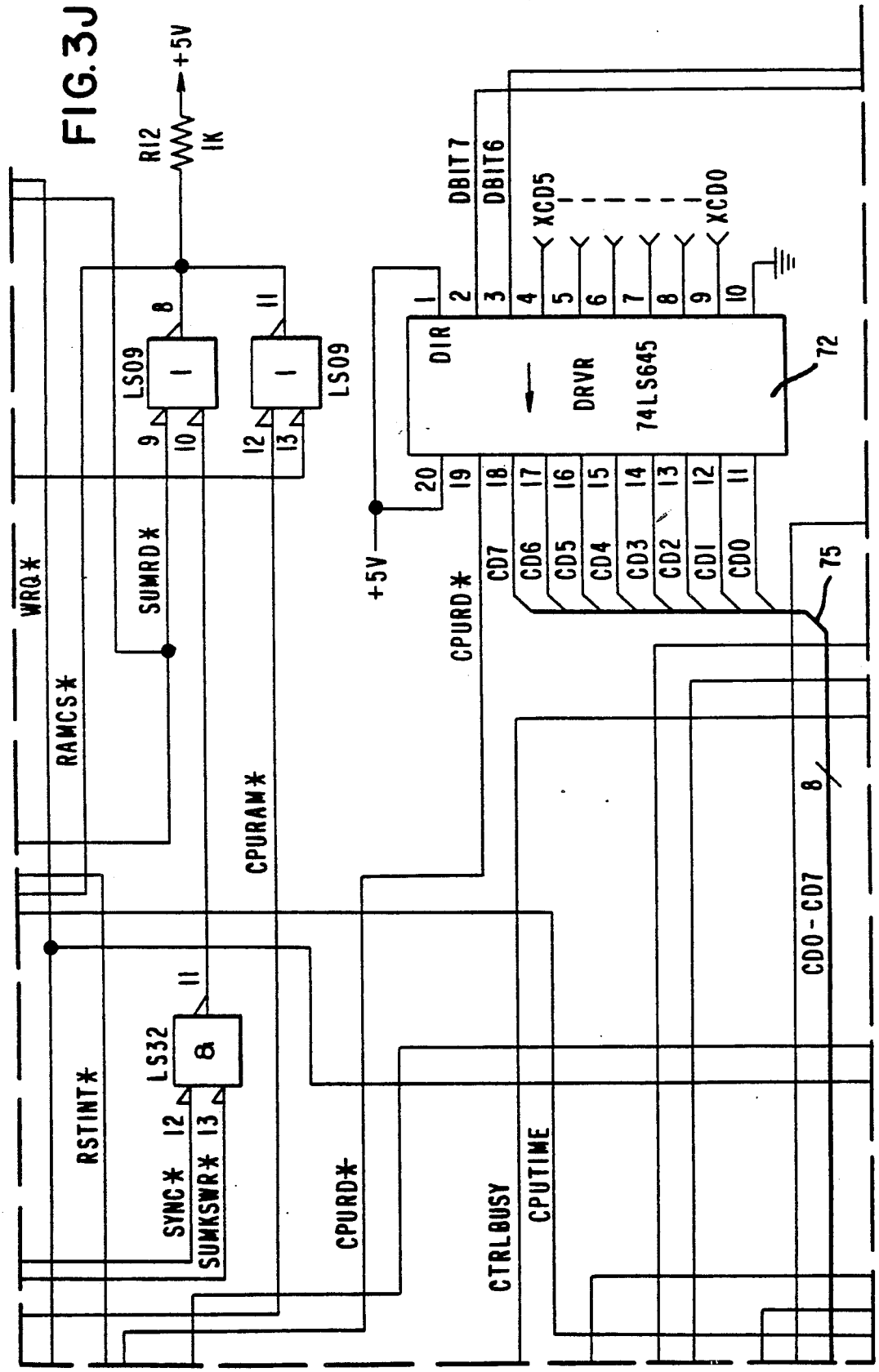
Figure 3K:
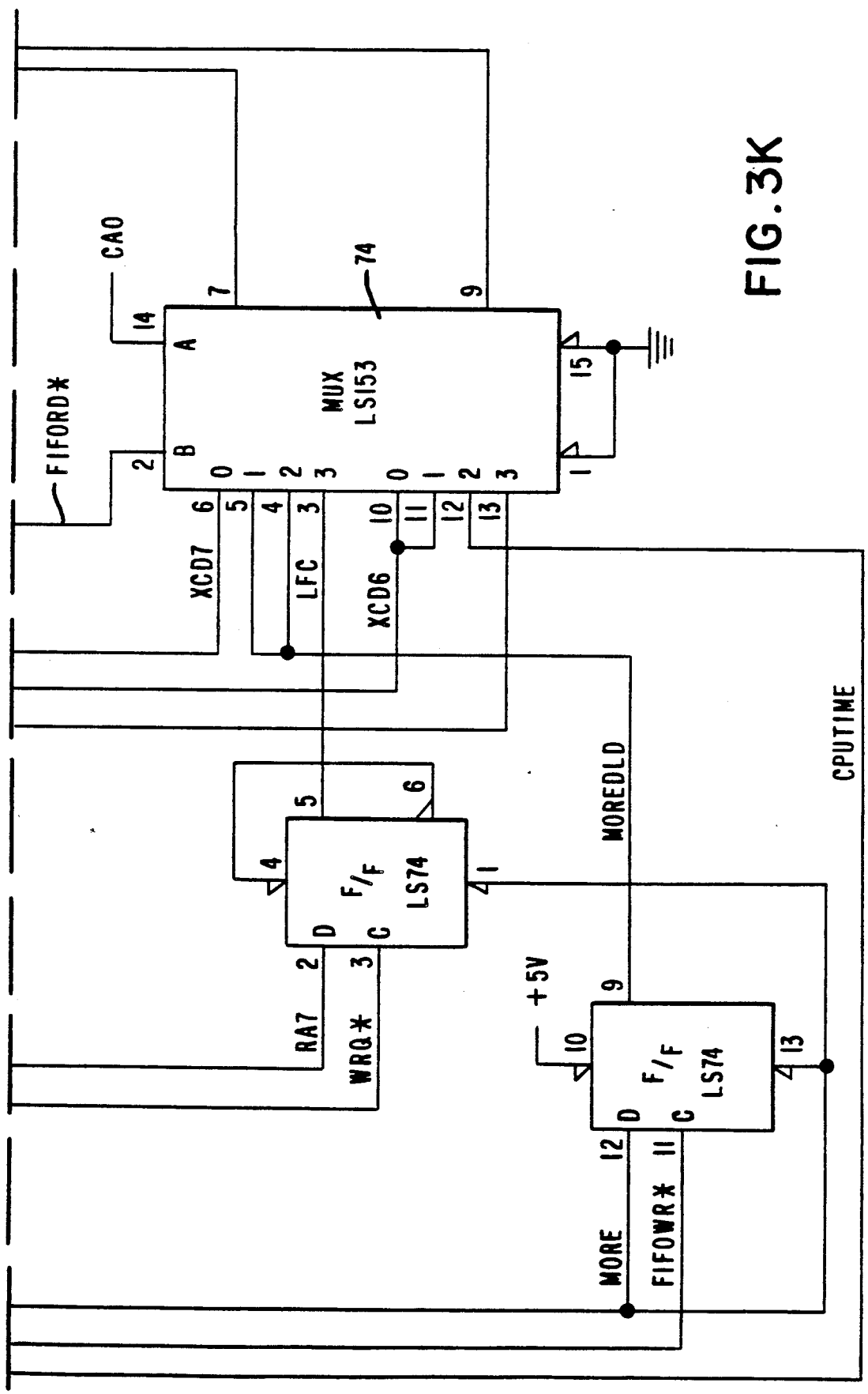

FIGS. 3A-3K, arranged as shown in the map of FIG. 4, form a schematic diagram of the communications controller circuit 20 of FIG. 2A and 2B. The manufacturer's part number is shown with each symbol of each component of the schematic. Decoder 48 is a programmable array logic device (PAL) programmed in accordance with Table I.

TABLE I

```
CPUSEL = CA19*CA18*/CA17*/CA16*/CA15*/CA14
CPURAM = CA19*CA18*/CA17*/CA16*/CA15*/CA14*/MEMR+
         CA19*CA18*/CA17*/CA16*/CA15*/CA14*/MEMW
FIFORD = CA19*CA18*/CA17*/CA16* CA15*/CA14*/MEMR
CPURD  = CA19*CA18*/CA17*/CA16* CA15*/CA14*/MEMR+
         CA19*CA18*/CA17*/CA16*/CA15* CA14*/MEMR
```

FUNCTION TABLE

| CA 19 | CA 18 | CA 17 | CA 16 | CA 15 | CA 14 | MEMR | MEMW | CPU SEL* | CPU RAM* | FIFO RD* | CPU RD* |
|---|---|---|---|---|---|---|---|---|---|---|---|
| L | L | L | L | X | X | X | X | H | H | H | H |
| H | L | L | L | X | X | X | X | H | H | H | H |
| L | H | L | L | L | L | L | L | H | H | H | H |
| H | H | L | L | L | L | H | H | L | H | H | H |
| H | H | L | L | L | L | L | H | L | L | H | H |
| H | H | L | L | L | L | L | H | L | L | H | H |
| H | H | L | L | H | H | X | X | H | H | H | H |
| H | H | L | L | H | L | H | X | H | H | H | H |
| H | H | L | L | H | L | L | X | H | H | L | L |
| H | H | L | L | L | H | L | X | H | H | H | L |

* = And
+ = Or
/ = Inverse
X = Don't Care

As will be discussed further, the character data for each user 14 occupies two storage locations in the RAM 54, and the keystroke data and user ID occupies two storage locations in the RCV FIFO 70. To write data into or read data from the RAM 54, the host computer sends addresses from C0000(H) to C001F(H) to the decoder 48. To read data from the RCV FIFO 70, the host computer sends an address of C8000(H) followed by C8001(H) to the decoder 48. To perform a status read, the host computer 12 sends the address C4000(H) to the decoder 48. These addresses are decoded by the decoder 48 to address the correct device at the location specified, as described. It will be understood that one of ordinary skill in the art can assemble a controller 20 in accordance with the diagram of FIGS. 3A–3K.

Figure 5:
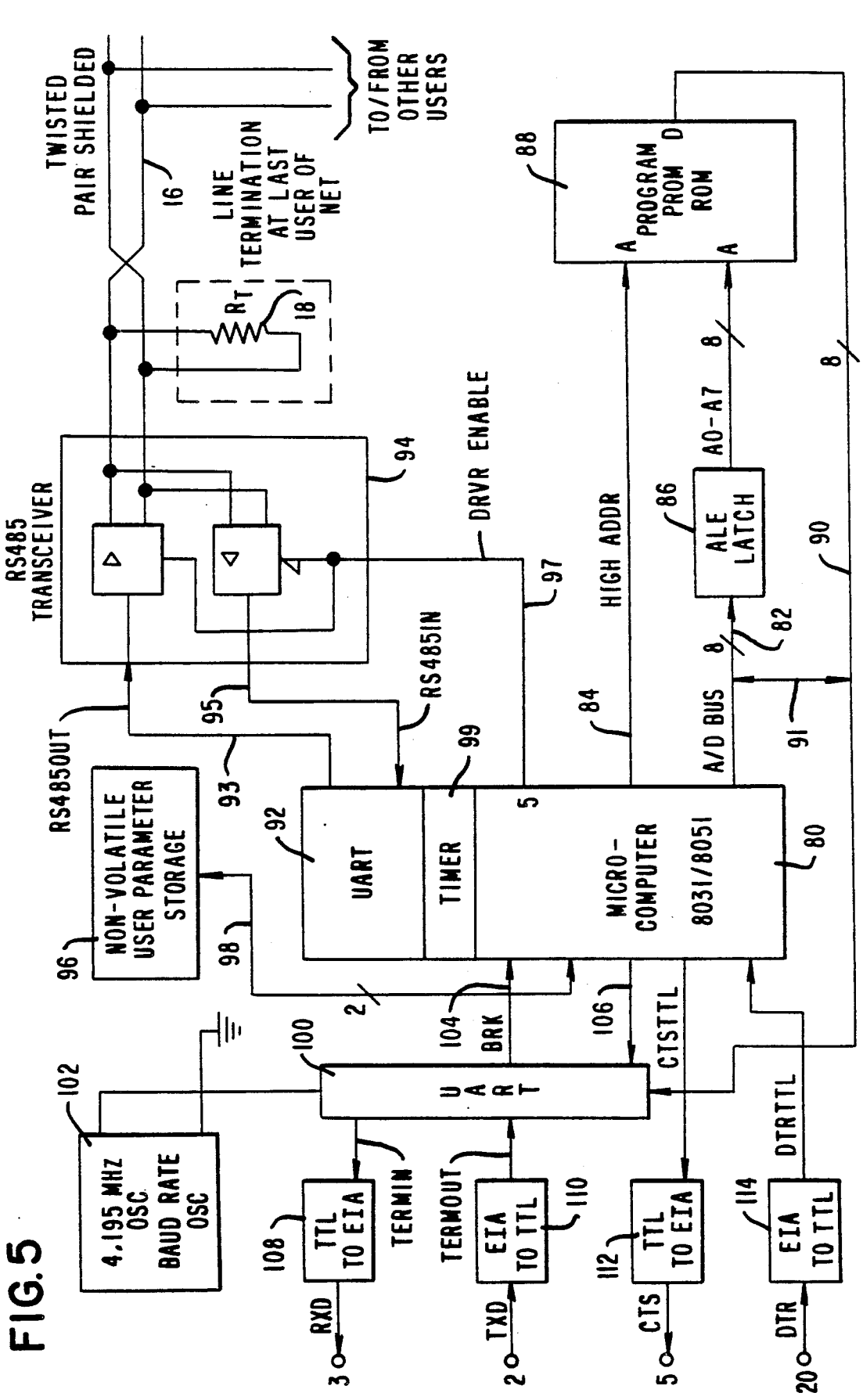
FIG. 5 is a functional block diagram of a terminal element circuit of each of the users in the network of FIG. 1.
Figure 6A:
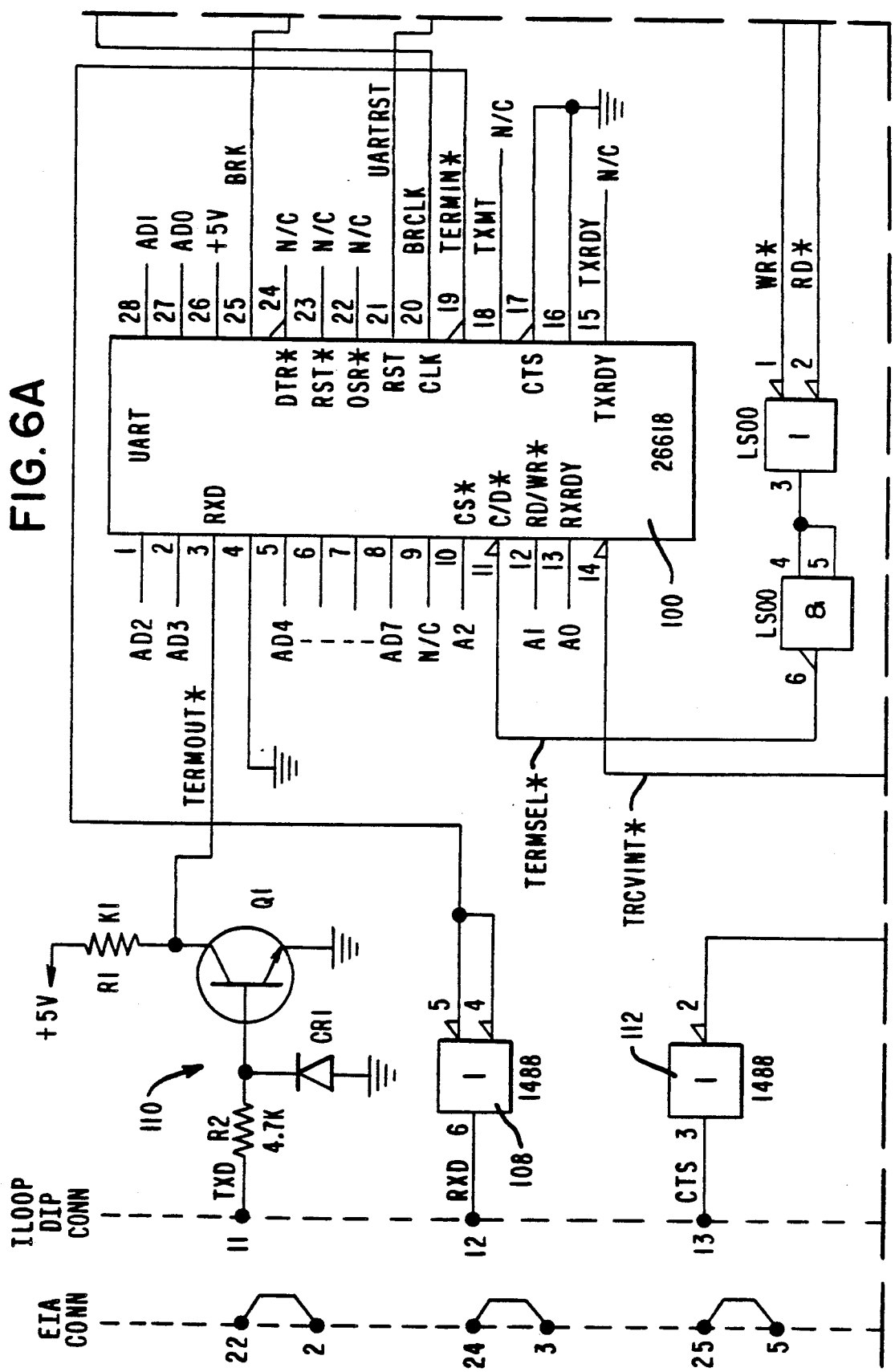
Figure 6D:
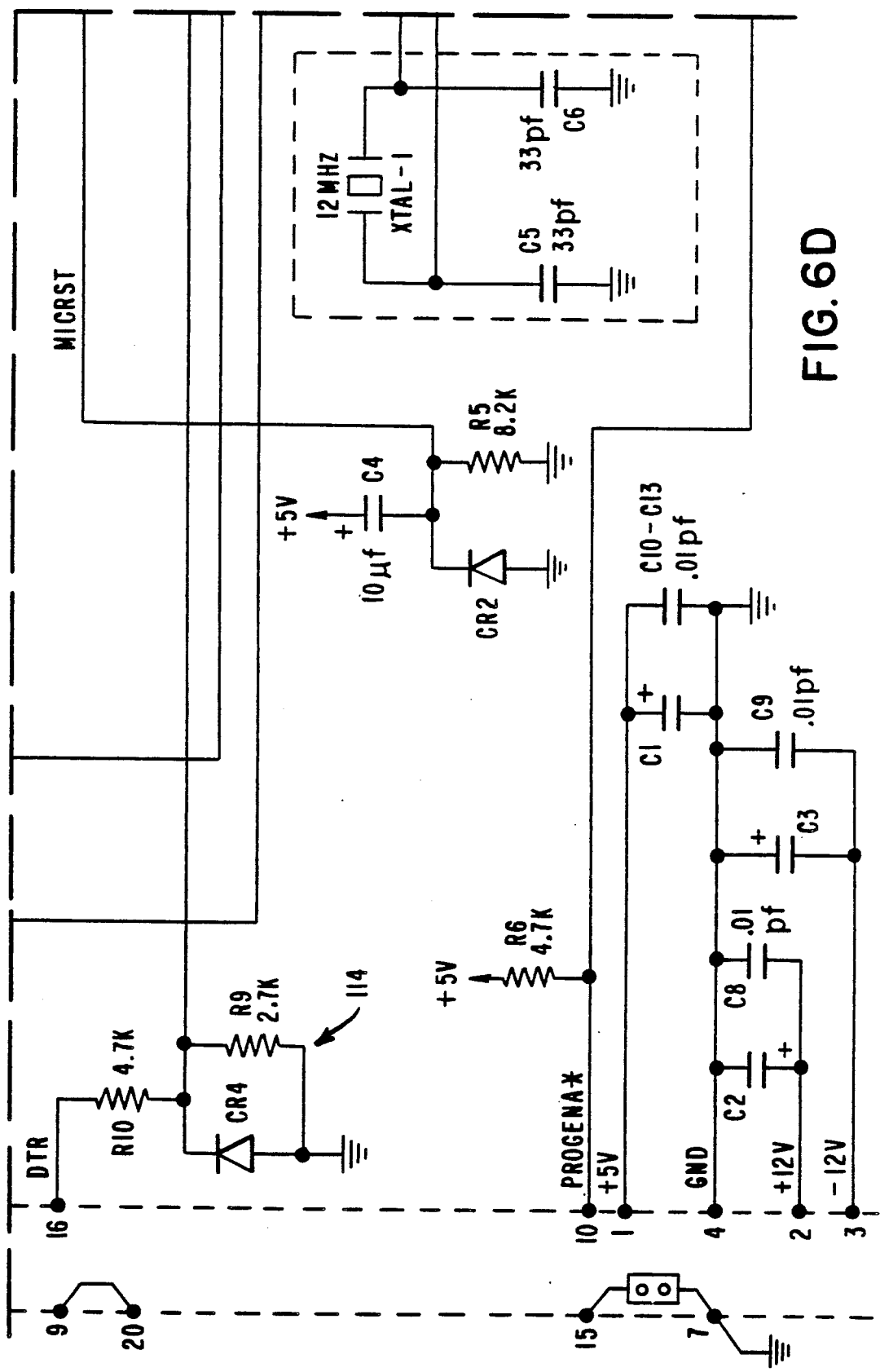
Figure 6E:
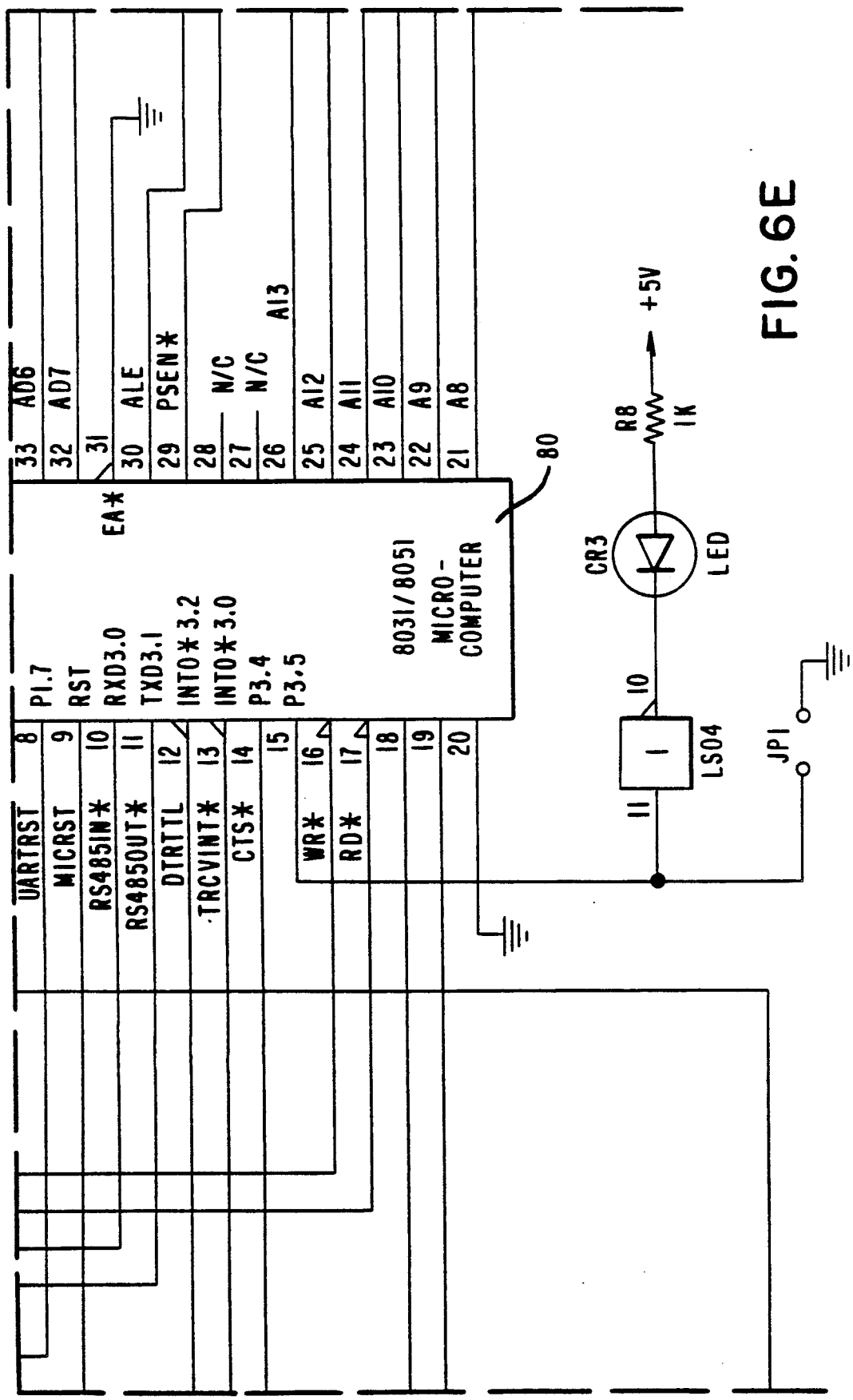
Figure 6F:
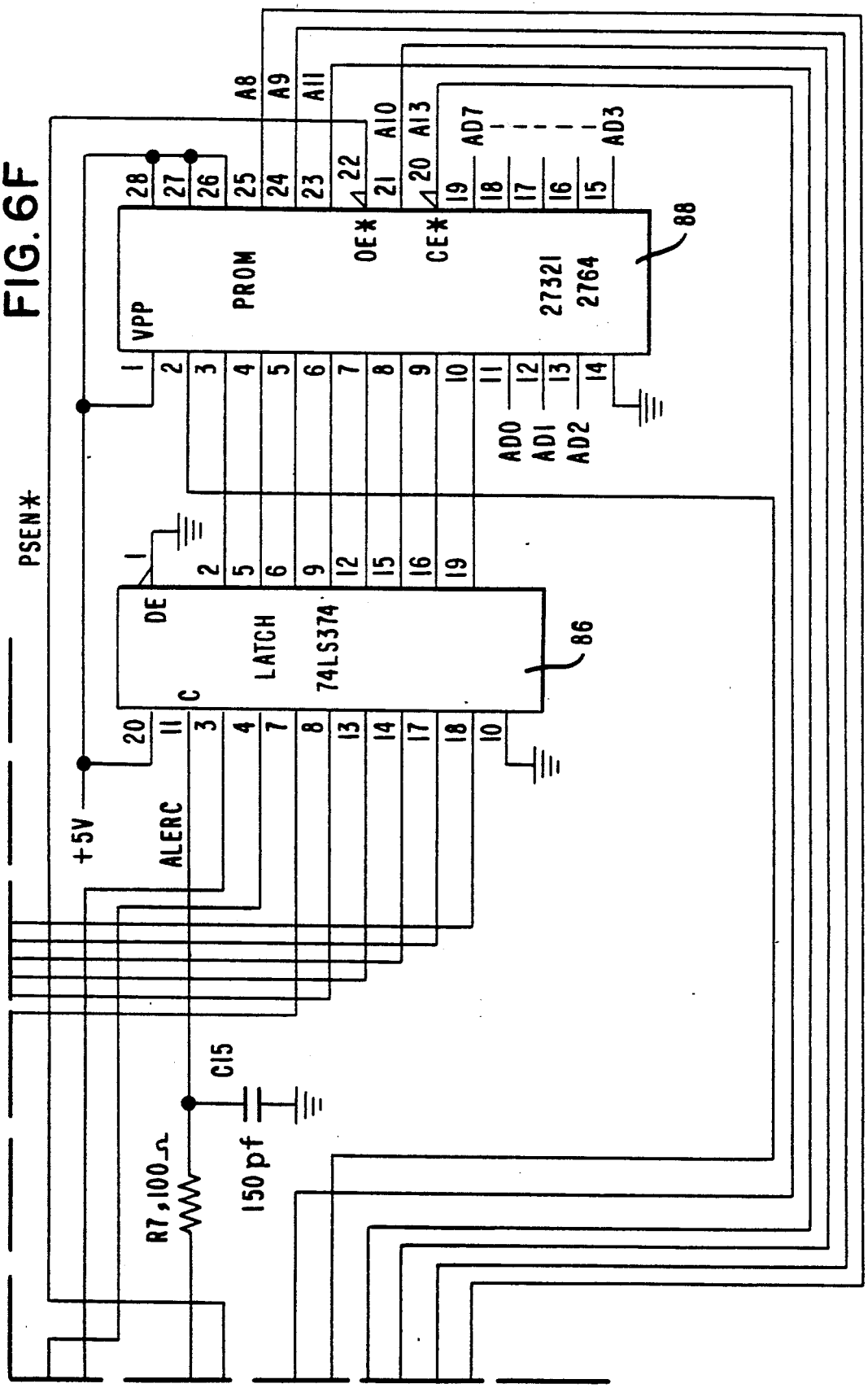

FIG. 5 is a functional block diagram of the terminal element 22 of each user 14. The terminal element 22 includes an 8031 microcomputer 80 connected to an eight bit A/D bus 82, and a high byte address bus 84. The A/D bus 82 is connected to an ALE latch 86, whose output is connected to the low byte address terminals of a PROM or ROM 88 (referred to herein as a ROM). The data terminals of the ROM 88 are connected to an eight bit A/D bus 90 which is connected to the A/D bus 82 by bus extension 91. This provides for storage of a program in the ROM 88, as discussed in connection with the ROM 40 of FIG. 2B. If the program is kept to less than four thousand bytes, the program may be installed on an 8051 microcomputer which may be used in place of the 8031 microcomputer, the latch 86 and the ROM 88.

The built-in UART 92 of the microcomputer 80 outputs serial data to the twisted pair cable 16 via an RS485OUT conductor 93 and an RS485 transceiver 94, and receives serial data from the twisted pair cable 16 via a RS485IN conductor 95 and the RS485 transceiver 94. The direction of the data through the transceiver 94 is controlled by a driver enable (DE) signal on conductor 97 from pin 5 of the microcomputer 80.

The microcomputer 80 also includes a built-in timer 99 which is programmed, as will be explained, such that the operations of all of the terminal elements 22 are synchronized with the master timer 33 of the microcomputer 30 of FIG. 2B.

A non-volatile storage device 96 is provided having a non-volatile memory for storing the identification or ID of the user 14 to which the terminal element 22 of FIG. 5 is assigned The non-volatile storage device 96 is connected by a pair of serial data conductors 98 to two ports of the microcomputer 80. In response to prompts, a user may assign a user ID from 0 to F(H) during an initial power-up routine The user ID in storage 96 is then used by the microcomputer 80 to receive characters from and send keystrokes to the host computer 12.

An external UART 100, timed by a baud rate oscillator 102, is connected to the A/D bus 90 for receiving data from and sending data to the microcomputer 80. Break and control signals between the UART 100 and the microcomputer 80 are transmitted over a break (BRK) conductor 104 and a control conductor 106, respectively. Serial data is sent from the UART 100 to a data terminal (not shown) via a TTL-to-EIA converter 108 to the RXD terminal of an RS232 EIA connector. Serial data is received from the TXD terminal of the RS232 EIA connector via an EIA-to-TTL converter 110.

A Clear To Send (CTS) signal is sent from the microcomputer 80 to the CTS terminal of the RS232 connector via a TTL-to-EIA converter 112, and a Data Terminal Ready (DTR) signal is sent from the DTR terminal of the RS232 connector to the microcomputer 80 via an EIA-to-TTL converter 114. Although connected to the interrupt pins of the microcomputer 80, the CTS and DTR signals do not actually cause an interrupt, but are sampled to determine the condition of the data terminal (not shown) of the user 14 to determine if it is ready to send or receive data.

FIGS. 6A–6F, arranged as shown in the map of FIG. 7, form a schematic diagram of the terminal element 22 of FIG. 5 with the manufacturer's part number shown with each component of the schematic diagram. It will be understood that one of ordinary skill in the art can assemble a terminal element 22 in accordance with the diagram of FIGS. 6A–6F.

At this time, the time based transmission of data will be discussed. Data is transmitted between the host computer 12 and the users 14 of FIG. 1, during time frames each of which is divided into tim slots. A designated number of time slots is defined for sending characters to users, one time slot being assigned to each user. Since all of the users receive all of the data transmitted, the user selects the character transmitted to it from its assigned time slot. Each time frame is started with a sync/poll character from the host computer 12. Each user detects the sync/poll character and, responsive to that character, starts its own timer 99 such that it operates in synchronism with the host computer 12 and all other users 14. Each time frame also includes a time slot reserved for the transmission of a single keystroke from a user to the host computer 12. The sync/poll character includes a user ID which identifies the user 14 which is permitted to send a keystroke to the host computer 12 during the current time frame. Thus, in a network having sixteen users, a complete cycle would include sixteen time frames. Each time frame in the cycle provides for the transmission of one character from the host computer 12 to each of the sixteen users 14, and for the transmission of one keystroke from one designated user to the host computer 12. Thus, in a complete cycle of sixteen time frames, sixteen characters may be sent from the host computer 12 to each user 14, and each user may send one keystroke to the host computer 12.

In a typical case, the network operates with parity in a half duplex protocol at 375 kilobaud, with each data terminal operating in full duplex at 19.2 kilobaud. Each time slot has a forty-eight microsecond time interval, and a frame has twenty-two time slots, as will be discussed. As discussed, a complete frame cycle has sixteen frames, each frame starting with a sync/poll character comprised of an eight bit character plus parity. The sync/poll character is transmitted by the controller 20 and received by the terminal elements 22 of all of the users 14. The time of arrival of the sync/poll character defines the start of all of the user time bases, and the low nibble (low four bits) defines which user is permitted to use the assigned time slot in the current frame for keystroke data transmission to the host computer 12.

FIG. 8 is a timing diagram for the network of FIG. 1. FIG. 8, 8-A shows the timing frame divided into twenty-two time slots numbered −1 to 20. Each time slot has a duration of forty-eight microseconds, and the frame has a total duration of 1,056 microseconds. In the present configuration, character reception from the host computer 12 to a user 14 is effectively at 9,600 baud, and each user may send about 60 keystrokes per second to the host computer 12.

FIG. 8, 8-A shows the time slot allocation. Time slot −1 is reserved for the sync/poll character previously described. Time slots 0–15 are reserved for sending user character data from the host computer 12 to the sixteen users (0–F(H)). Time slot 16 is reserved to allow for line turnaround time (LTA) wherein the twisted pair cable 16 of FIG. 1 is changed from transmitting character data in one direction, to transmitting keystroke data in the other direction. Time slot 17 is reserved for the transmission of keystroke data from a designated user 14 to the host computer 12. Time slots eighteen and nineteen are not used and time slot twenty is used for line turn around to change the direction of data transmission back to its original condition.

FIG. 8, 8-C shows the user time slots. In time slot −1, the user is in a loop waiting for a sync/poll character. When the terminal element 22 detects a sync/poll character, the timer 99 internal to its 8031 microcomputer (see FIG. 5) is started such that the terminal element's time base matches the timing of the time slots of 8-A. The terminal element 22 also checks the low nibble of the sync/poll character to see if it is authorized to transmit a keystroke during time slot 17.

FIG. 8, 8-D shows the enabling of the RS485 transceiver 34 of FIG. 2B by the microcomputer 30 of the controller 20. The RS485 transceiver 34 of FIG. 2B is enabled unconditionally from the start of time slot 20 of the previous time frame through the end of time slot 15.

FIG. 8, 8-E shows the enabling of the RS485 transceiver 94 of FIG. 5 by the microcomputer 80 of the terminal element 22. The RS485 transceiver 94 is enabled unconditionally from the start of the time slot 16 to the end of the time slot 17. It will thus be understood that time slots 16 and 20 are provided for the line turn around as previously discussed.

FIG. 8, 8-F shows the transmission of character data by the controller 20 to the terminal elements 22. The sync/poll character is unconditionally transmitted at the beginning of each time frame. Character data is transmitted to specific users during their time slots on a conditional basis only if the controller 22 has a character to send to a user in its designated time slot.

FIG. 8, 8-G shows the transmission of keystroke data by the polled terminal element 22 as designated in the sync/poll character. The polled terminal element 22 conditionally transmits a keystroke in time slot 17 only if it has keystroke data to transmit.

FIG. 8, 8-H shows the condition of the CPU TIME signal (see FIG. 3C) previously discussed in connection with the controller 20. The CPU TIME signal starts slightly after the beginning of time slot 15, and ends at the end of the time slot 19 This is the time during which the host computer 12 may write character data into the RAM 54 without interfering with character data being read from the RAM 54 by the microcomputer 30 for transmission to the of users 14 (see FIG. 4).

FIG. 8, 8-I shows the XMIT INTR signal from the interrupt logic circuit 66 of FIG. 2. The XMIT INTR signal is enabled at the beginning of the CPU TIME signal of 8-H to signal the host computer 12 that it may start writing data to the RAM 54.

FIG. 8, 8-J shows the RCV INTR signal from the interrupt logic circuit 66 of FIG. 2. The RCV INTR signal is enabled at about the beginning of time slot 20 when keystroke data is placed in the RCV FIFO 70 of FIG. 2, and remains enabled until all keystroke data is removed from the RCV FIFO 70 by the host computer 12, as previously explained.

FIG. 9 is a memory map of the character data stored in the RAM 54 of FIG. 2 by the host computer 12 of FIG. 1. The character data is stored in thirty-two contiguous locations in the RAM 54, with two eight bit bytes for each character. The high order byte has eight bits, with the high order bit reserved as a validity bit. The first seven bits of the low order byte are used to store the character in a seven bit ASCII format. An eighth bit is available in the low order byte for use in an eight bit format, if desired. Since in a seven bit format the eighth bit is always zero, the eighth bit of the character received by a terminal element 22 is checked as an additional verification that the received character is valid.

The high order bit of the high order byte contains a flag to indicate to the microcomputer 30 of FIG. 2B, whether the character data in the RAM 54 has been transmitted. When the character data is written into the RAM 54 by the host computer 12, the high order flag bit is set as a one. When the character data in the RAM 54 is transmitted over the cable 16 by the microcomputer 30, the high order bit is cleared by the microcomputer 30 to a zero. Thus, by checking the high order flag bit of the character data in RAM 54, the microcomputer 30 can determine whether or not the stored character data has been transmitted. Thus, the character data for a specific user is transmitted in its assigned time slot only if its high order bit read from the RAM 54 is a one.

Figure 10:
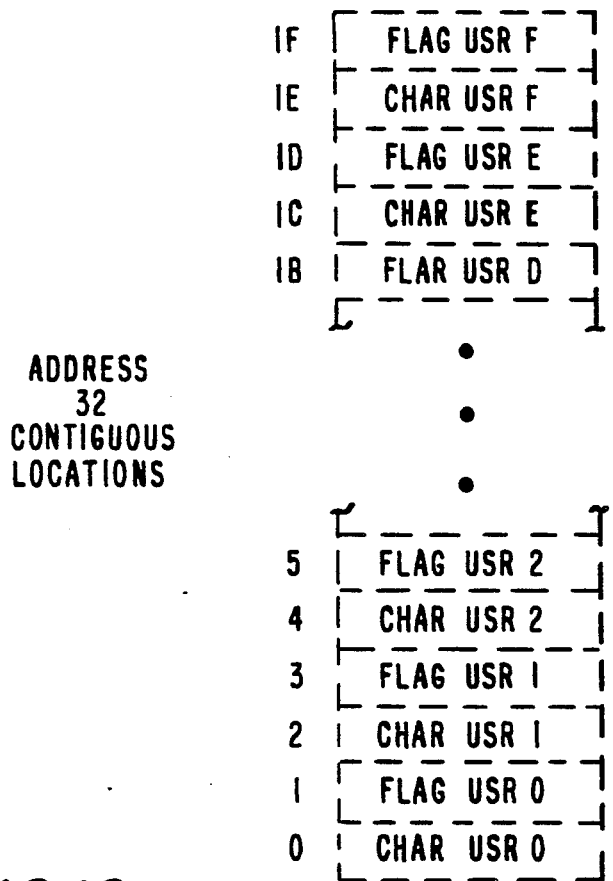
FIG. 10 shows the formats of data sent between a host computer and the users of the network of FIG. 1.

FIG. 10 shows the formats of data sent over the cable 16, hereinafter referred to as link data. The link data format of the sync/poll character is shown in FIG. 10, 10-A. The low order nibble contains the user ID (0-F(H)), the first three bits of the high order nibble are zeros, and the high order bit of the high nibble is set to a one. The link data format includes a ninth bit (P) for parity. Even parity is used for the sync/poll character.

FIG. 10, 10-B shows the link data format for character data sent from the host computer 12 to a user 14. The first seven bits of the link data format of 10-B contains the character in seven bit, ASCII format. The high order eighth bit is always zero in the seven bit format, and thus provides the terminal element 22 with an additional character validity check for the link data going to a user 14 from the host computer 12. Odd parity for the character data is used.

FIG. 10, 10-C shows the data link format for keystroke data going to the host computer 12 from a user 14 in a seven bit ASCII format. The first seven bits contain the keystroke in ASCII format, and the eighth bit is a zero. Odd parity is used. In this case, the controller 20 may or may not check the eighth bit as a validity bit, as desired. If the eighth bit is not checked by the controller 20, the user may transmit data in an eight bit ANSI format. In this manner, both seven bit and eight bit formats may be used as long as the host computer 12 knows which format to transmit and receive for each user.

Since in a seven bit format, all bit combinations represent a valid character, a break character must be formatted differently. FIG. 10, 10-D shows a break character wherein a 55(H) is loaded in the lower seven bits of the link data format, and even parity is used. Thus in a seven bit format, the host computer 12 checks each keystroke received for a parity error and a 55(H) (see FIG. 10C). On finding a parity error and a 55(H) in the keystroke data, the host computer 12 knows it has received a break character.

Returning to the RCV FIFO 70 of FIG. 2B, the RCV FIFO 70 contains two eight bit characters for each keystroke received from a user 14. The first eight bit character contains the first eight bits of the link character discussed in connection with FIG. 10D. The low order nibble of the second FIFO character contains the four bit ID of the user 14 from which the keystroke data came. The first bit of the high order nibble contains a zero, the second bit contains the result of a parity error check of the data (1=parity error and 0=no parity error), and the third bit contains a one. The high order bit of the high nibble contains the state of the MORE output on pin 21 of the RCV FIFO 70 (see FIG. 3I). Thus, if there are more entries in the RCV FIFO 70, the MORE bit will be a one, and if there are no more entries in the RCV FIFO 70, the MORE bit will be zero. The host computer 12 reads both character bytes from the RCV FIFO 70 during a FIFORD*, as discussed in connection with FIG. 2.

FIG. 11 is a timing diagram of a read from the RCV FIFO 70. If the RCV INTR signal (FIG. 11, 11-A) is enabled, the host computer 12 will unconditionally read at 150 of 11-B, the first 16 bits in the RCV FIFO 70 to get the keystroke data and the ID of the user who sent the keystroke. If a parity error is indicated, and the keystroke data in the first character byte is 55(H), the host computer 12 knows that a break character has been sent by the user identified by the ID in the second character byte. If the MORE bit is enabled, the host computer 12 continues to read the RCV FIFO 70 at 152 of FIG. 11, 11-B until the RCV FIFO 70 is empty.

FIG. 12 is a timing diagram of the timing for the writing of character data to the RAM 54 of FIG. 2A by the host computer 12. FIG. 12, 12-A shows the occurrence of the XMIT INTR signal discussed in connection with 8-I. If, when the XMIT INTR signal is enabled, the host computer 12 is attending to higher priority task, it will not answer the XMIT INTR interrupt signal until it has completed the higher priority task. It is possible that when the higher priority task is completed, the time allotted for the host computer 12 to write data to the RAM 54 will have elapsed. To prevent interference between the host computer 12 writing to the RAM 54 and the microcomputer 30 reading data from the RAM 54, the host computer 12 reads the CPU TIME signal with a status read command to determine if writes to the RAM 54 by the host computer 12 are still allowed. The use of a dual ported FIFO in place of the RAM 54, as discussed, avoids this restriction.

FIG. 12, 12-B is an illustration of the CPU TIME signal which is enabled at 154 and stays enabled until 156. The negative going edge 156 of the CPU TIME signal occurs at a time when the host computer 12 may still complete a write cycle to the RAM 54 without interfering with a read by the microcomputer 30.

FIG. 12, 12-C is a diagrammatic illustration of the RAM access time in which the host computer 12 may write to the RAM 54. The access time starts at 158 and ends at 160 for a duration, in the present embodiment, of approximately 250 microseconds. It will be seen that the CPU TIME signal ends at 156 which leaves enough time ($t_1$) between 156 and 160 to complete a write cycle to the RAM 54.

FIG. 12, 12-D shows the signal CPUSEL of FIG. 2 which controls the addressing of the RAM 54 by addresses from the host computer 12 through the octal gate 52 of FIG. 2A. The actual occurrence of the CPUSEL of 12-D will vary with the duration of $t_2$, depending upon when the host computer 12 actually responds to the interrupt, and writes data to the RAM 54 ($t_3$). Time $t_3$ must not exceed the time $t_1$ which is necessary for the host computer 12 to complete a write cycle of 16 characters to the RAM 54. After receiving a XMIT INTR signal as shown in 12-A, the host computer 12 reads the CPU TIME status bit (FIG. 12, 12-B) by issuing a C4000(H) address to the decoder circuit 48 of FIG. 2. Responsive to the C4000(H) address, the decoder 48 generates a CPURD* signal which passes the status bits through driver 72 onto the host data bus 75. The host computer 12 then checks the CPU TIME status bit to determine if it is operating within the RAM access time as shown in 12-C. If the CPU TIME status bit is high, a RAM write cycle is completed by the host computer 12 by writing data into the RAM 54 at addresses C0000(H)-C001F(H). Responsive to the addresses C0000(H) through C001F(H), a CPUSEL signal is generated by decoder 48 as shown in 12-D, allowing data to be written into the RAM 54. FIG. 12, 12-E shows a cycle of character data written from the host computer 12 into the RAM 54 during $t_3$.

Figure 13:
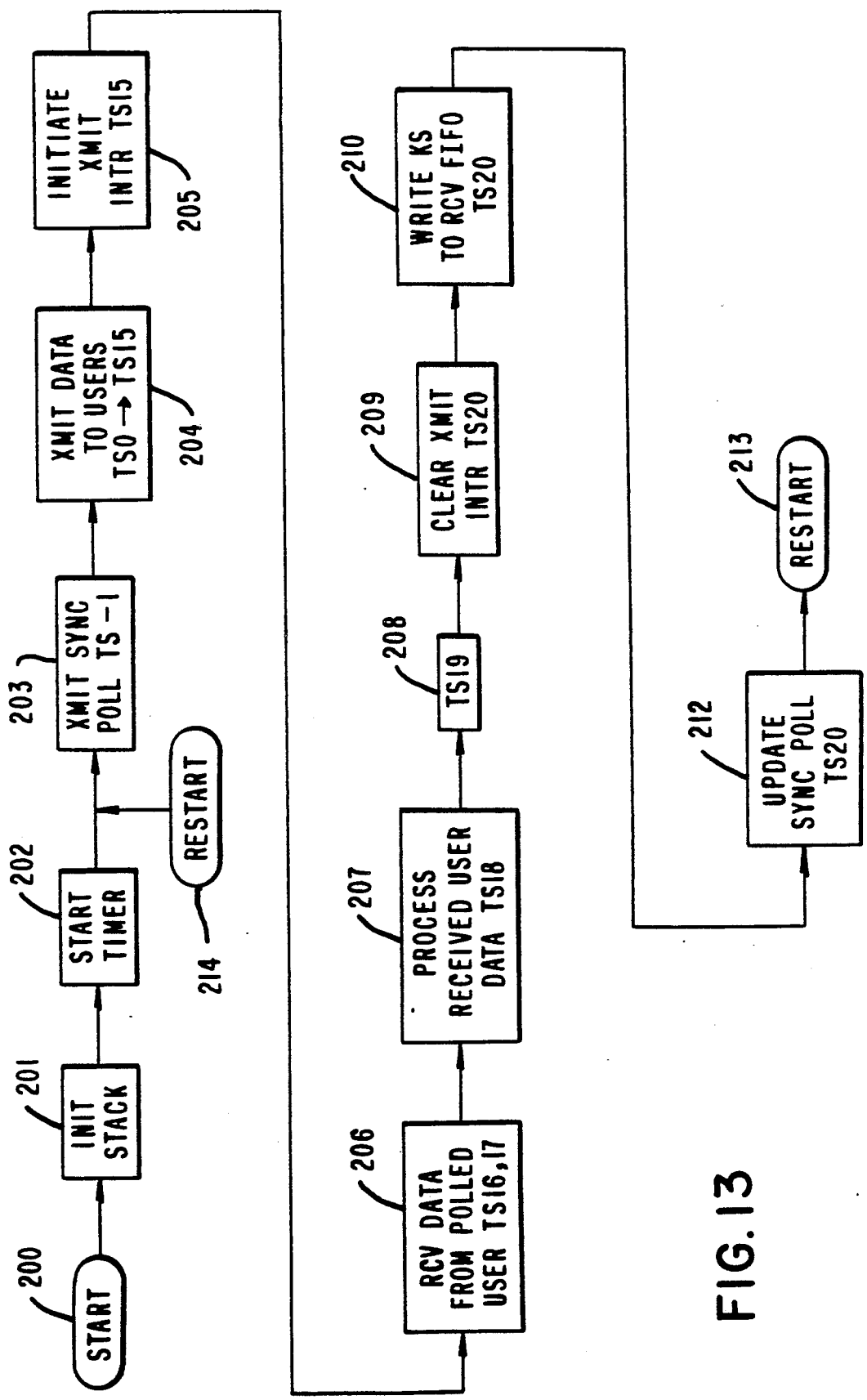
FIG. 13 is an overall flow chart of a program for use by a microcomputer in the communications controller of FIGS. 2A-2B.
Figure 14A:
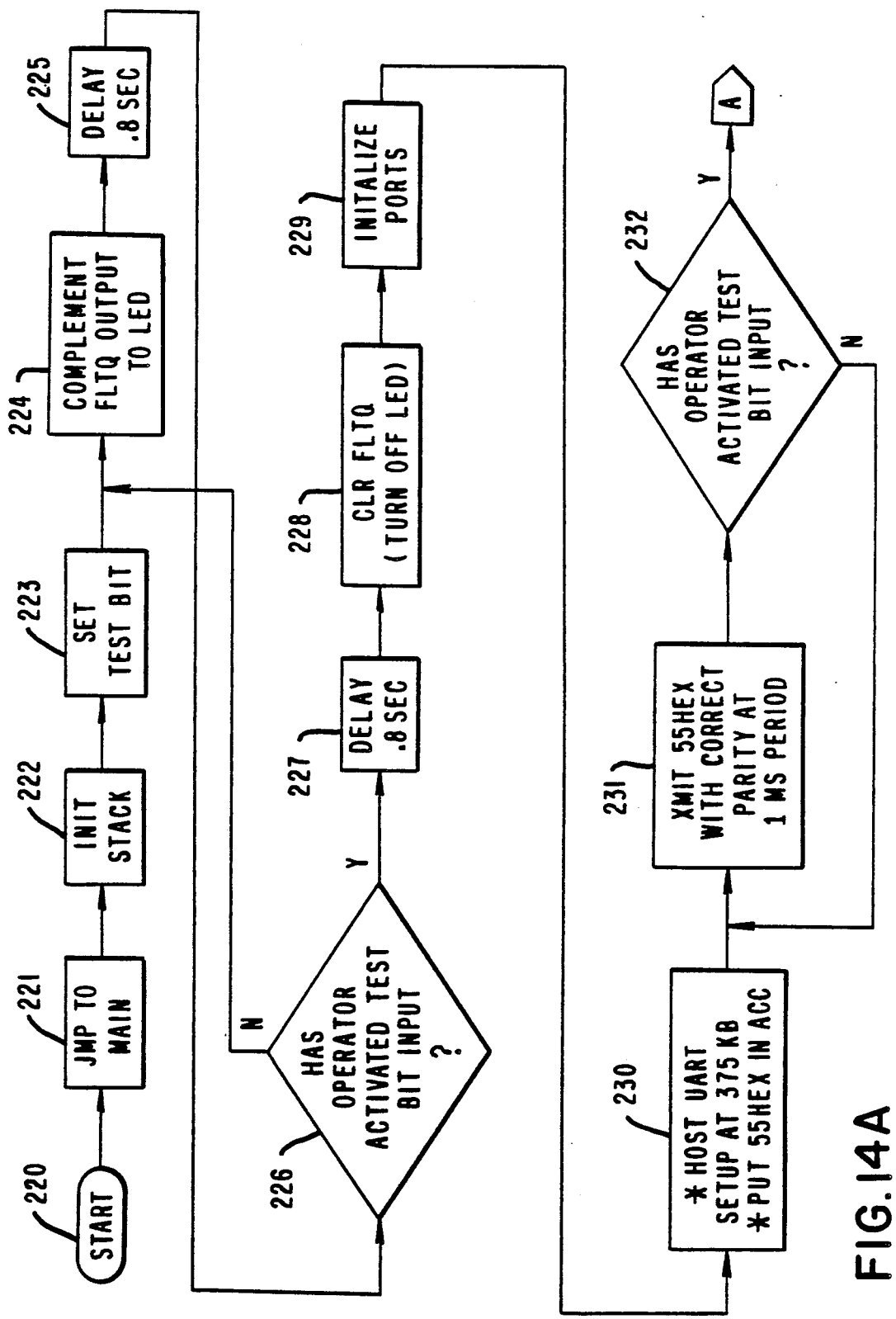
Figure 14C:
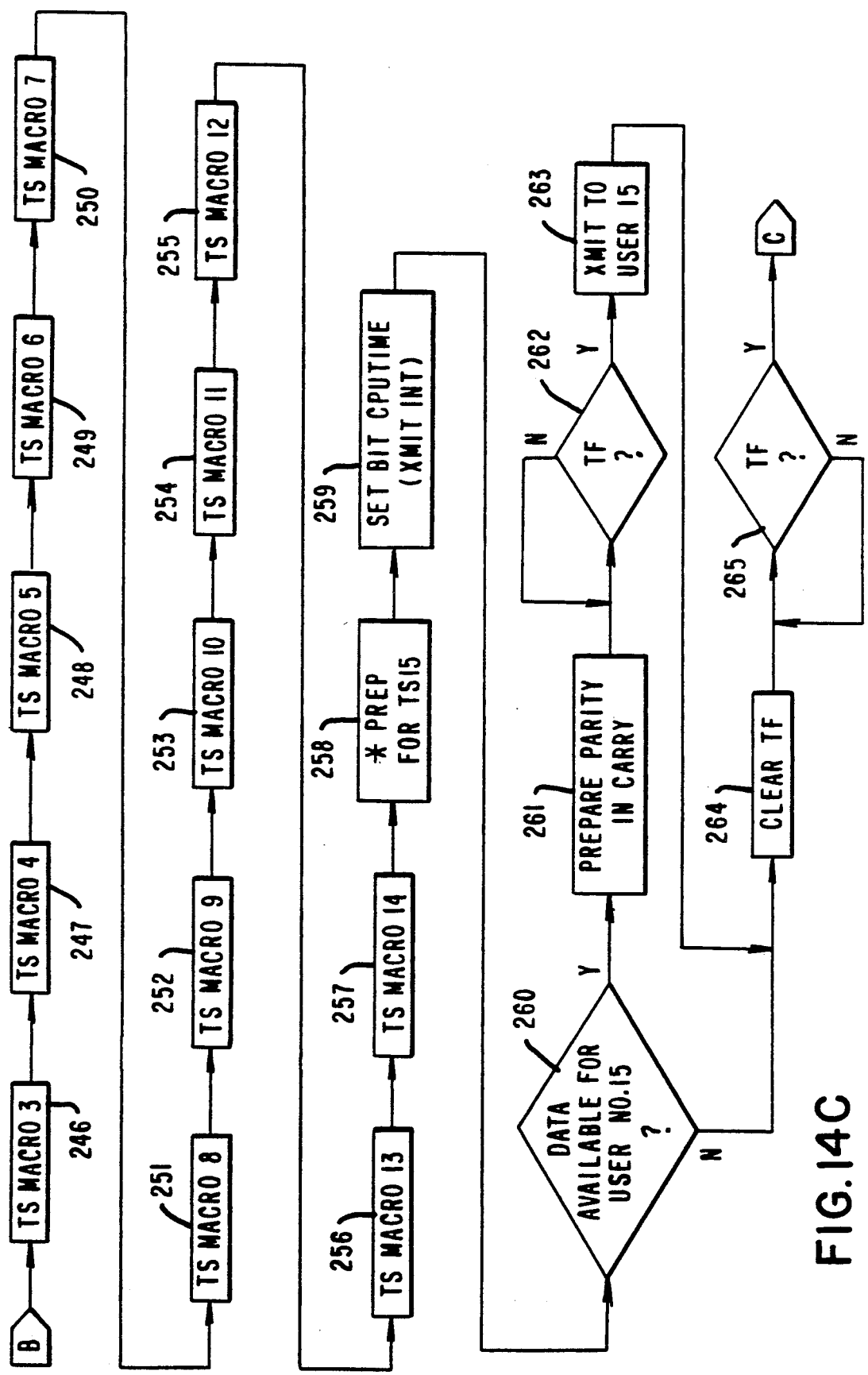
Figure 14D:
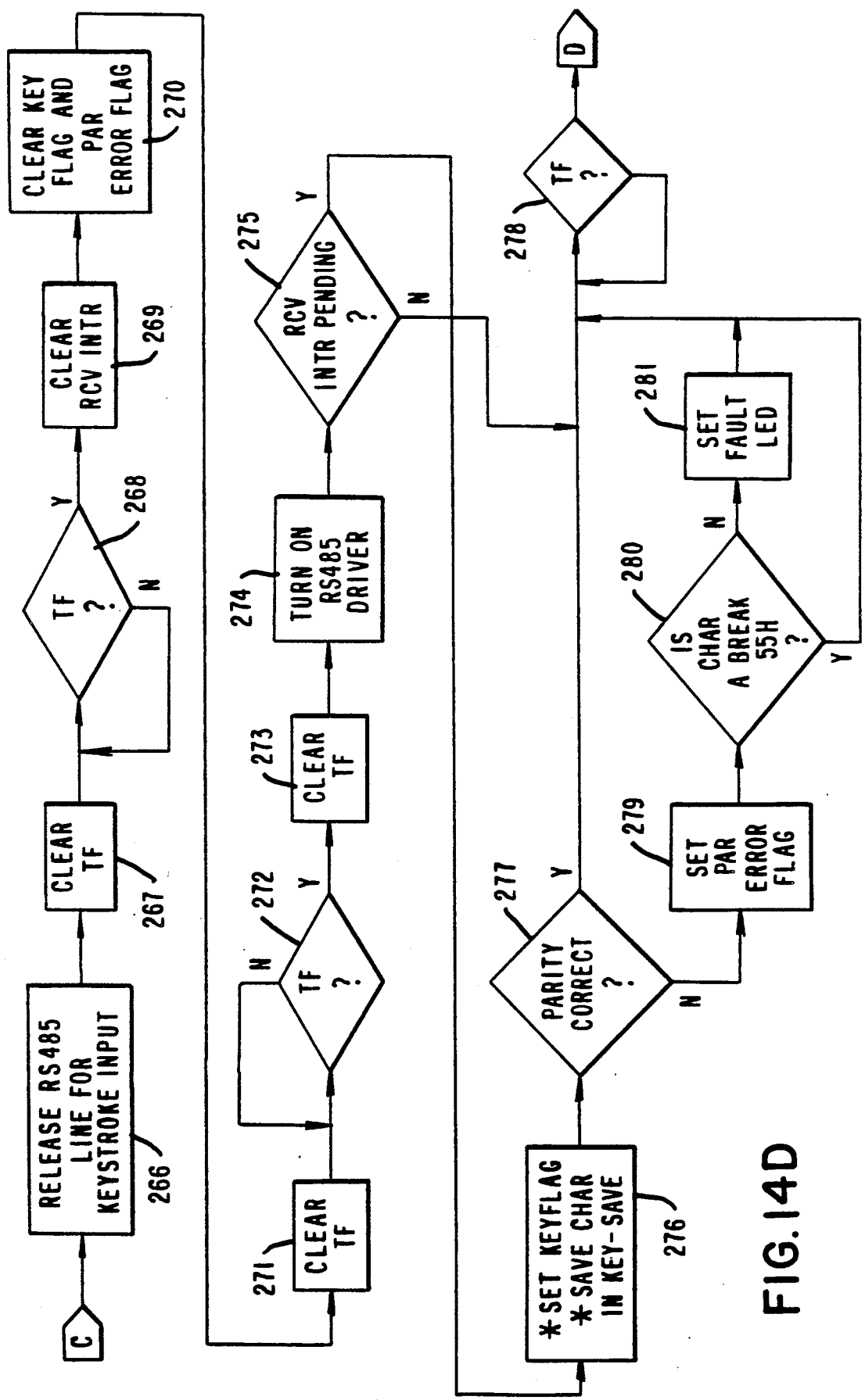
Figure 14E:
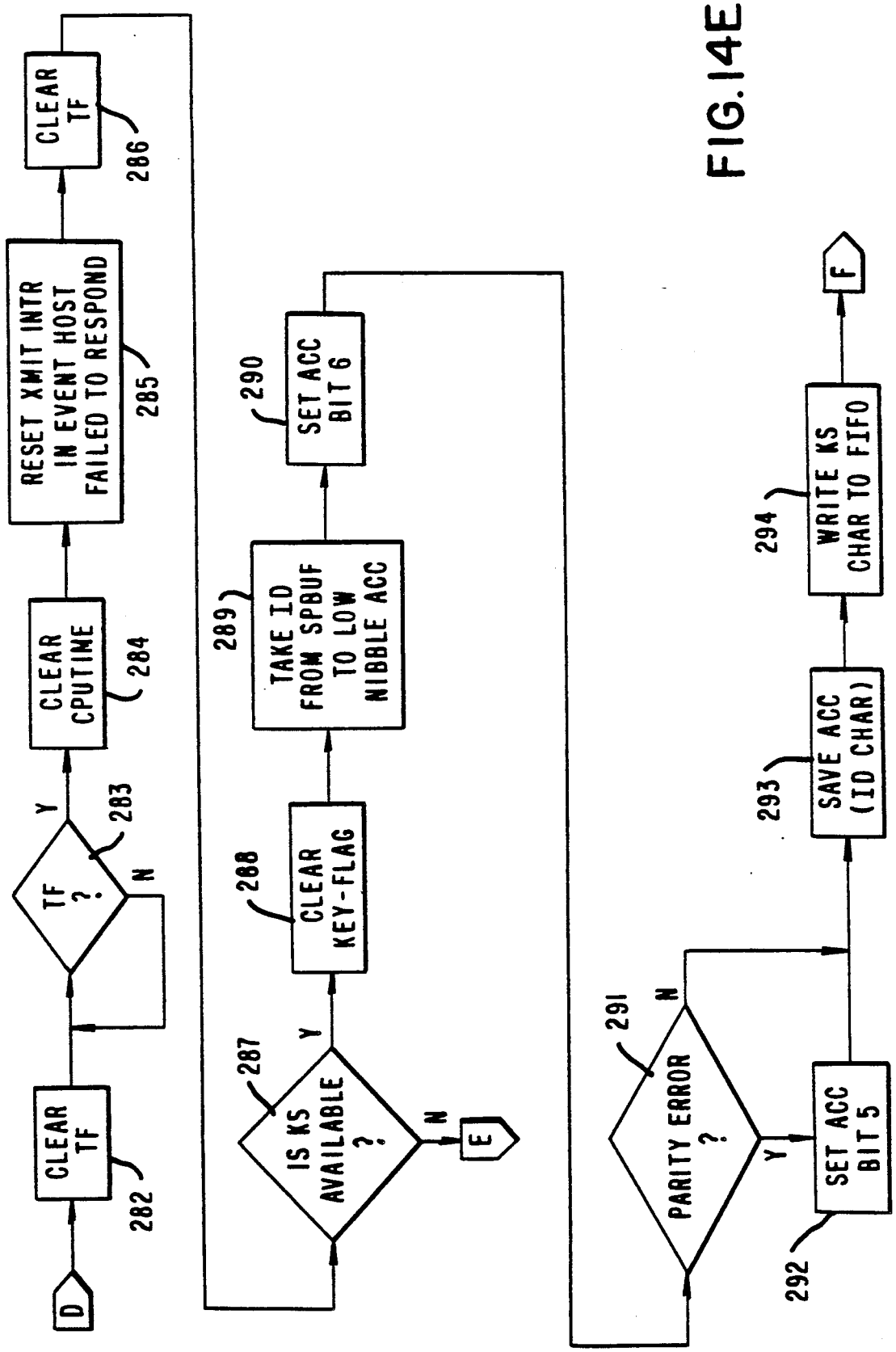
Figure 14F:
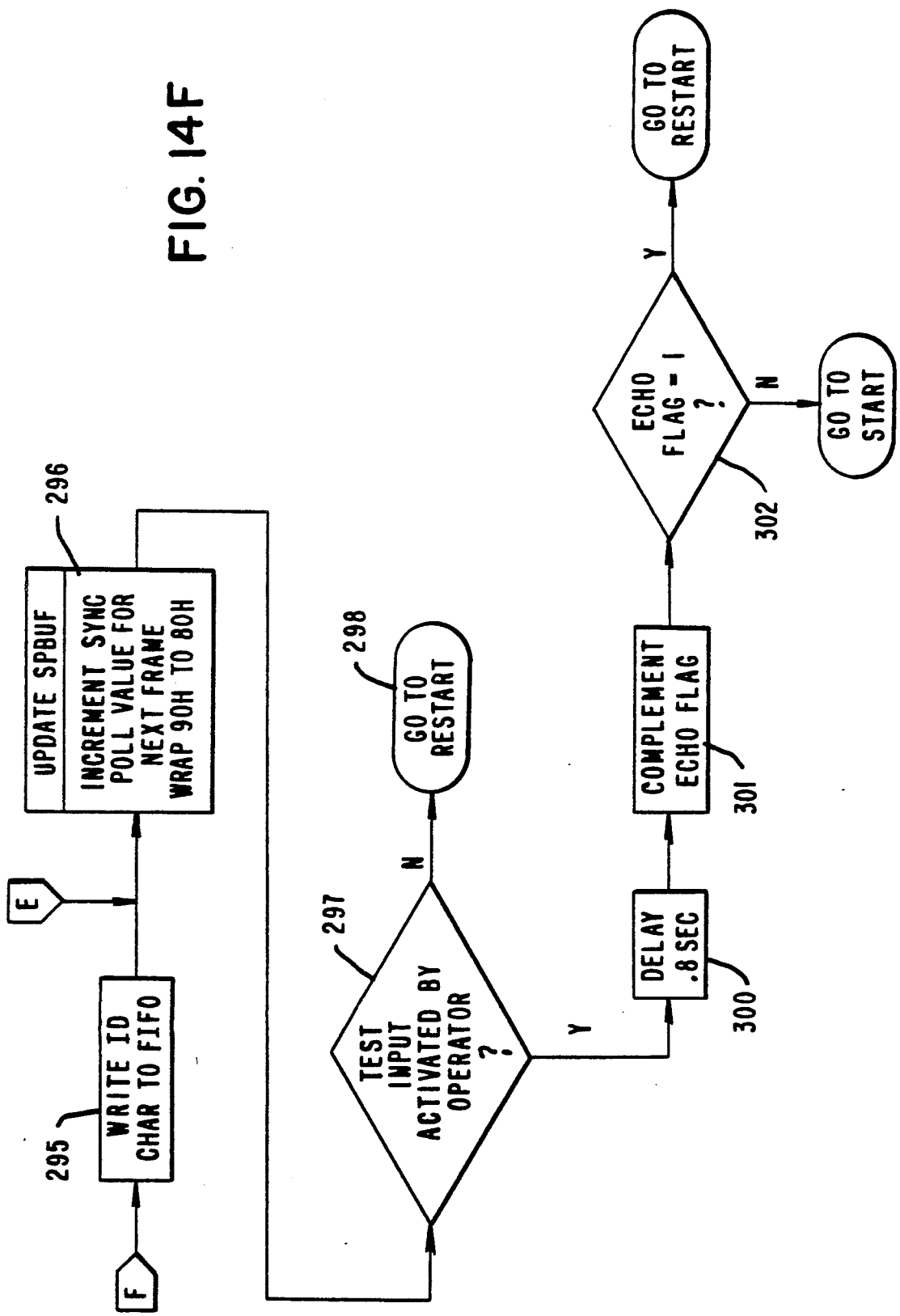

FIG. 13 is a flow chart which presents an overview of the programming for the microcomputer 30 of the controller 20 of the host computer 12. The program starts at 200 and completes an initialization phase 201 wherein initialization procedures for the microcomputer 30 are completed. At 202, the timer 33 internal to the microcomputer 30 is started which, as will be discussed, is used by all of the users 14 to synchronize the time slot protocol herein. At 203, a sync/poll character is transmitted over the twisted pair cable 16 in time slot −1. At 204, characters for the users 14 are transmitted over the twisted pair cable 16 in time slots 0–15. At 205, the XMIT INTR interrupt signal is initiated in time slot 15. At 206, keystroke data is received by the host computer 12 from the polled user in time slots 16 and 17. At 207, the keystroke data received from the user is processed in time slot 18. Time slot 19 is represented in 208. In time slot 20, shown at 209, the XMIT INTR interrupt signal is cleared In time slot 20, shown at 210, the keystroke data is written into the RCV FIFO 70 (see FIG. 2B). At 212, also in time slot 20, the sync/poll character is updated with a new user ID and at 213, the program returns to the restart position 214 and restarts at a new time slot −1.

FIGS. 14A–14F, when joined at off page connectors A–F, form a flow chart of the program illustrated in FIG. 13. The program starts at 220 and includes a first command shown at 221 which is a jump to main for starting the program. At 222, the stack in the microcomputer 30 is initialized. At 223, a test bit is set. At 224, the FLTQ output is complemented to cause the LED I1 (see FIG. 3A) to be energized for test purposes At 225, the program performs a 0.8 second delay. At 226, a check is made to see if the operator has activated a test bit input. If not, the program returns to the block 224 wherein the FLTQ output is complemented to cause the LED I1 to blink. At 227, the program performs another 0.8 second delay to debounce any signals coming from the operator. At 228, the FLTQ output is cleared to turn off the LED I1.

At 229, the ports of the microcomputer 30 are initialized. At 230, the host UART 32 of FIG. 2B is set up at 375 kilobaud, and a 55(H) is placed in an accumulator for a transmission to perform an RS 485 test. At 231, the 55(H) character is transmitted with parity at one millisecond periods to test the RS 485 loop. At 232, a test is made to see if the operator has activated a test bit input to proceed. If not, the program returns to the beginning of the RS485 test at 231. If the operator has activated the test bit, the program conducts a RAM test at 233 to test the RAM 54 out of FIG. 2A. At 234, the program enables an RS 485 fault interrupt bit for use in detecting cable shorts. At 235, the RS 485 driver is turned on in preparation for transmission. At 236, the timer 33, internal to the microcomputer 30, is set up for an automatic reload at 48 microseconds. The set up for the internal UART 32 and the internal timer 33 is fully described in the aforementioned publication from Intel for the Intel 8031 microcomputer. At 237, the internal timer 33 is started for putting out a timer pulse (herein referred to as a TIC) every forty-eight microseconds. At 238, the program clears a timer flag. At this point, the initialization procedure 201 and the start timer procedure 202, of FIG. 13, have been completed, and the program is ready to start transmitting characters to the users.

At 239, an accumulator is set up with the sync/poll character in preparation for time slot −1. Part of the set up is to assign a user ID in the sync/poll character as previously described. At 240, the timer flag is checked to see if a new time slot has started. The timer flag test at 240 is repeated over and over until the timer flag indicates that a new time slot has started. When a new timer flag is detected, the sync/poll character is transmitted at 241. At 242, the timer flag (TF) is cleared starting a new time slot. 243 represents a time slot macro for time slot 0. The macro waits for the timer flag and conditionally transmits character data in time slot 0 to user number 0. The blocks 244–257 (FIGS. 14B and 14C) represent time slot macros for time slots 1–14, respectively. The transmission of a character in time slot 15 is shown at blocks 258–265. In block 258, preparation is made for a time slot 15. At 259, the CPUTIME bit is set and the XMIT INTR interrupt is raised. A test is made at 260 to determine if data is available for user 15. If data is available, the parity bit is prepared at 261 and the time flag is checked at 262 for the beginning of time slot 15. At 263, the character is transmitted to user 15. If the test at 260 determines that no data is available for user 15 or that the data has been transmitted to user 15 at 263, the program goes to block 264 wherein the time flag is cleared. At 265, a check is made for the time flag to wait for the beginning of time slot 16. At 266, the RS 485 line is released to effect line turnaround for the input of keystroke data from a user to the host computer 12. At 267, the time flag is cleared and at 268, a time flag check is made to wait for the beginning of time slot 17.

At 269, the RCV INTR interrupt is cleared, and the key flag and parity error flag are cleared at 270 to prepare for the receipt of keystroke data. At 271, the time flag is cleared, and at 272 the time flag is checked to wait for the starting of time slot 18. At the start of time slot 18 at 273, the time flag is cleared, and the RS 485 driver is turned on at 274. At 275, a check is made to see if a RCV INTR interrupt is pending indicating that a keystroke character has been received. If the test at 275 is yes, the key flag is set and the keystroke is saved in KEY-SAVE at 276. At 277, a check is made to see if the parity of the received keystroke data is correct. If the parity is correct, a check is made at 278 for the time flag to wait for the beginning of time slot 19. Returning to the check at 277, if a parity error is detected, the parity error flag is set at 279. At 280, the received character is checked to see if it contains a 55(H) which indicates a break character has been received. If a break character has been received, the program goes to the test flag check at 278. If a break error has not been received, a parity error is indicated and the fault LED (LED I1) is set at 281 to give a visual indication that a fault has occurred.

At the start of time slot 19, the timer flag is cleared at 282. A timer flag check is then made at 283 to wait for the beginning of time slot 20. At the beginning of time slot 20, the CPU TIME bit is cleared at 284 and the XMIT INTR interrupt is reset at 285 in the event that the host computer has failed to respond. At 286, the time flag is cleared.

If the microcomputer 30 receives a keystroke, it must write the keystroke data with the ID of the user into the RCV FIFO 70 where it may be accessed by the host computer 12. At 287, a test is made to determine if a keystroke is available. If yes, the key flag is cleared at 288. At 289, the user ID is taken from the SPBUF and placed in the low nibble of the accumulator. At 290, bit 6 of the accumulator is set. At 291, a check is made to see if a parity error exists. If a parity error does exist, bit 5 of the accumulator is set at 292, and the program continues to 293. If no parity error exists, the program goes directly to 293, where the ID character of the user who sent the keystroke is saved in the accumulator. At 294, the keystroke character is written to the RCV FIFO 70, as previously explained. At 295, the ID character is written to the RCV FIFO 70. At 296, the SPBUF is updated, and the sync/poll value is incremented for the next frame. If the check at 286 to determine if a keystroke is available, was a no, the program goes directly to block 296 (off page connector E). At 297, a test is made to determine if the operator has activated a test input. If a test input has not been activated, the program goes to the restart 298 which jumps to 299 at FIG. 14B. If the operator has activated a test input at 297, the program goes to a start diagnostic routine. At 300, a 0.8 second delay is performed and at 301 the echo flag is complemented. A check is made at 302 to determine if the echo flag is equal to one. If it is, the program goes to restart (see 299 at FIG. 14B). If the echo flag is not equal to one, the program goes to start (see 220 at FIG. 14A).

Figure 15:
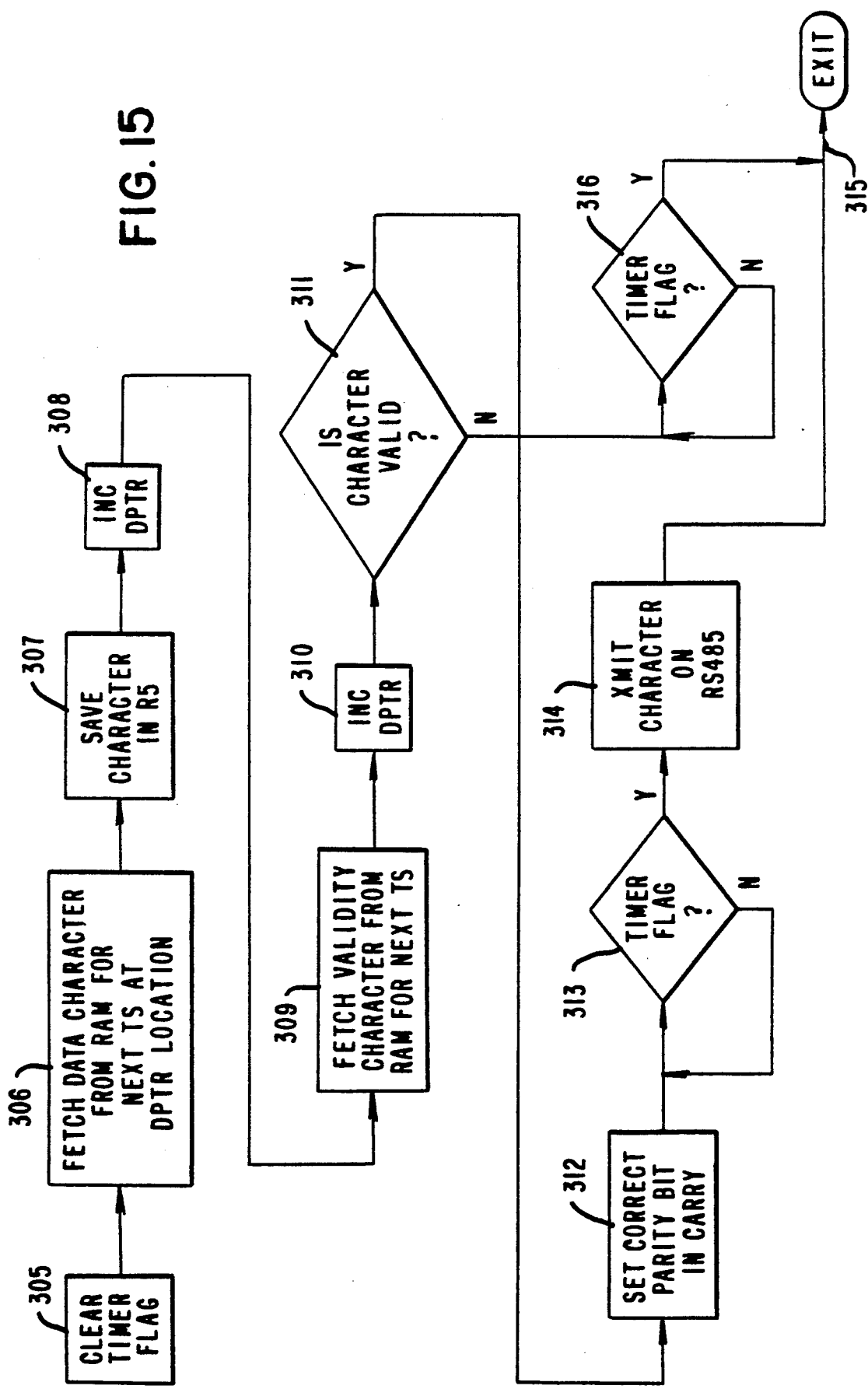
FIG. 15 is a flow chart of a time slot macro of the program of FIG. 13.
Figure 17B:
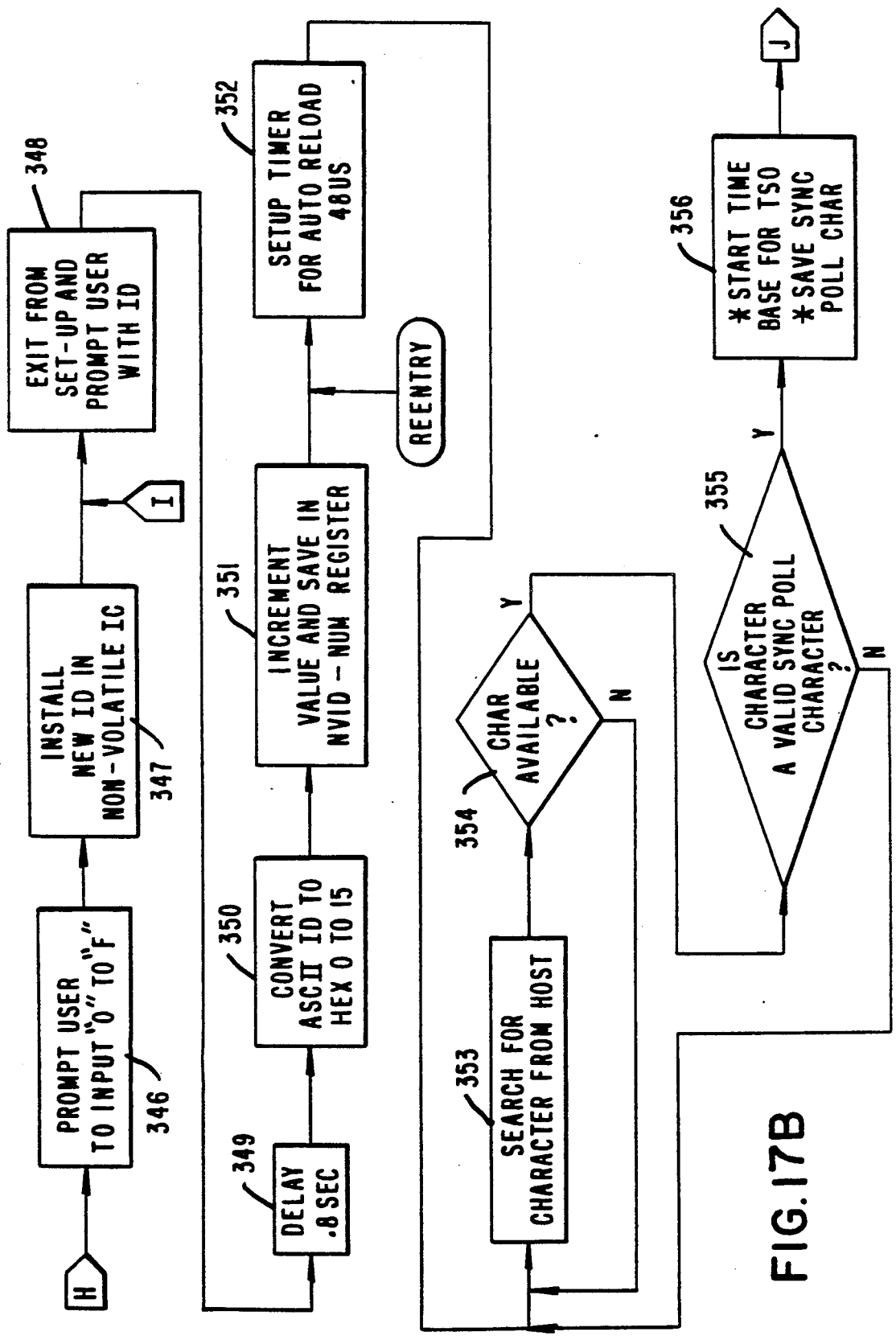
Figure 17C:
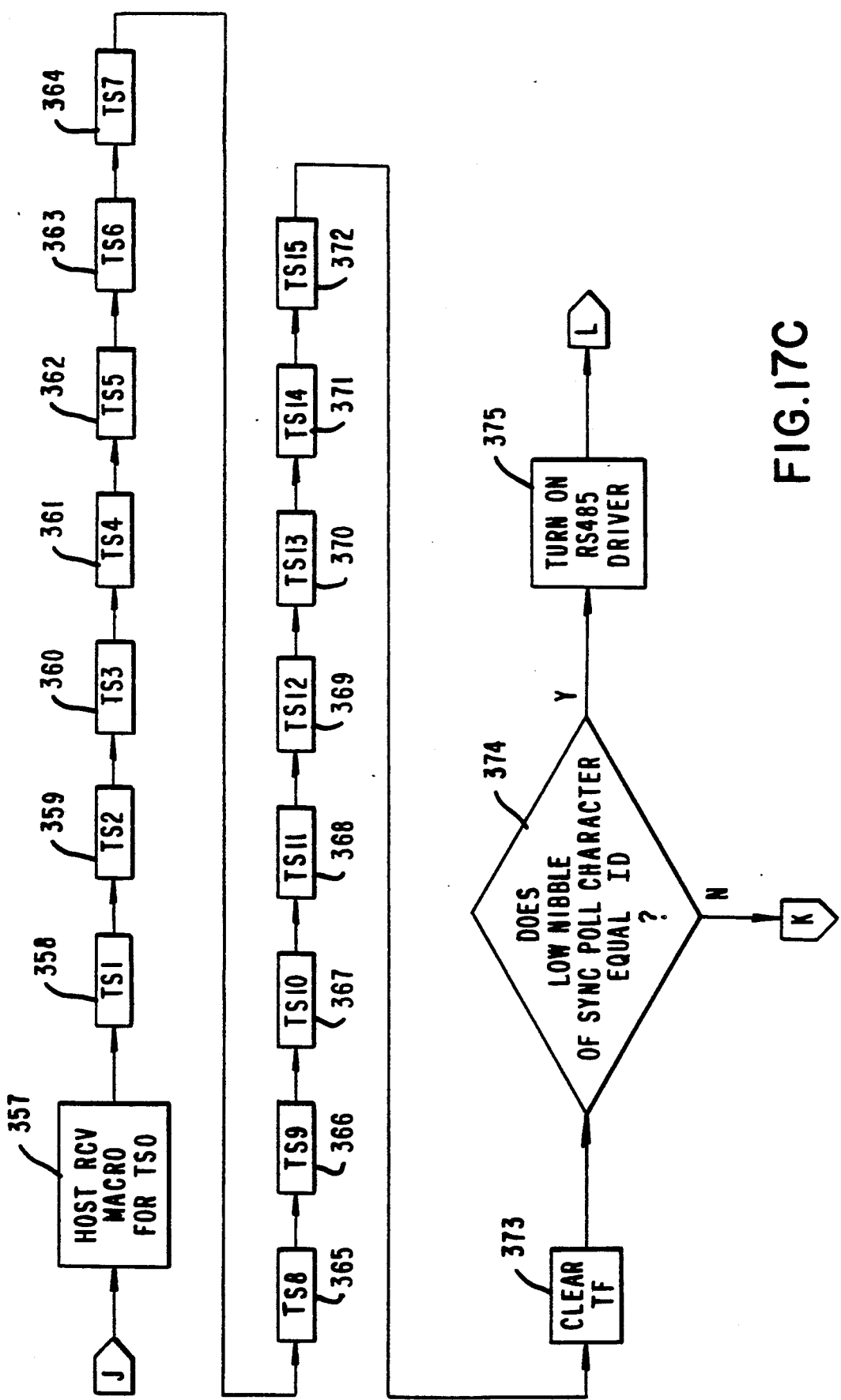
Figure 17D:
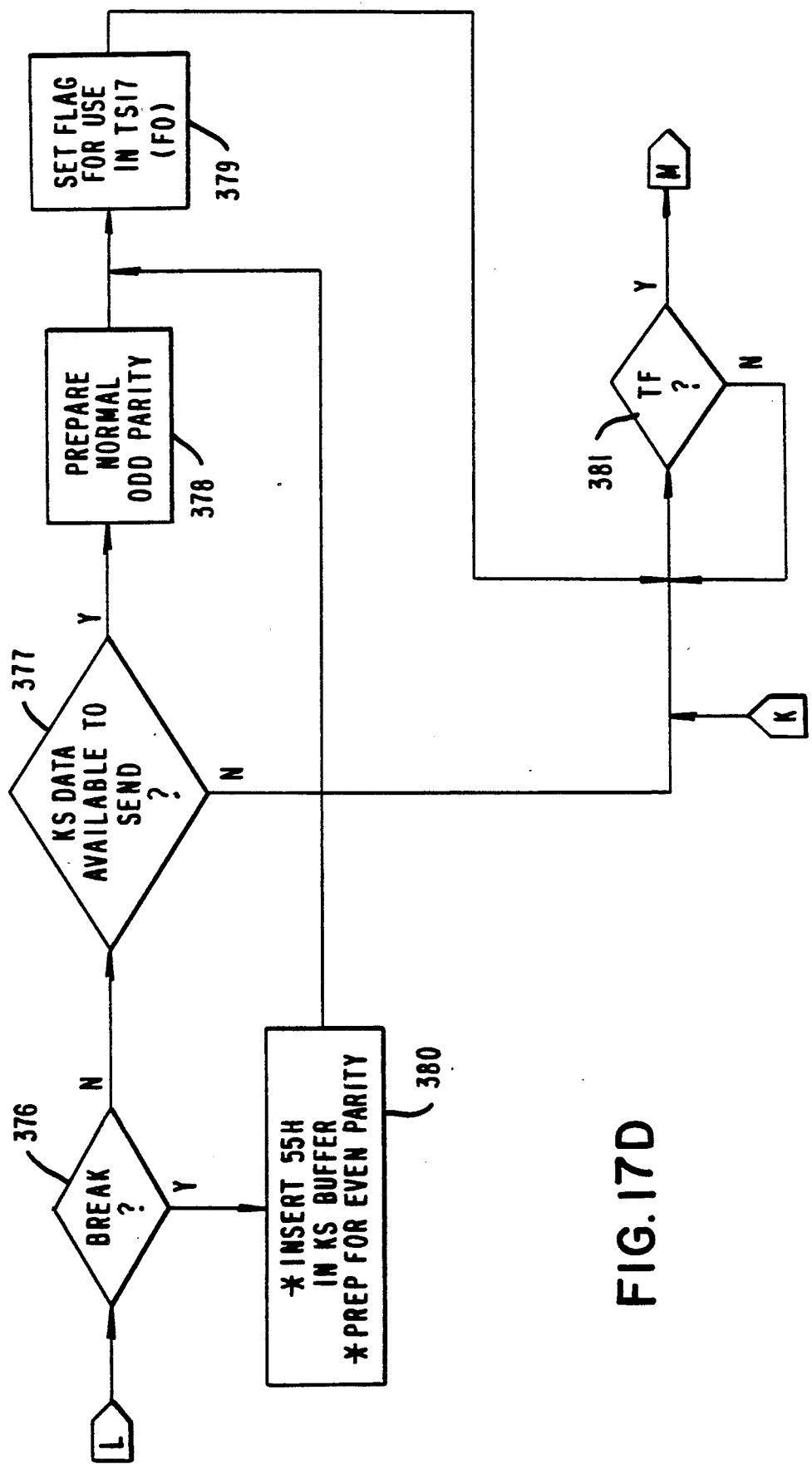
Figure 17F:
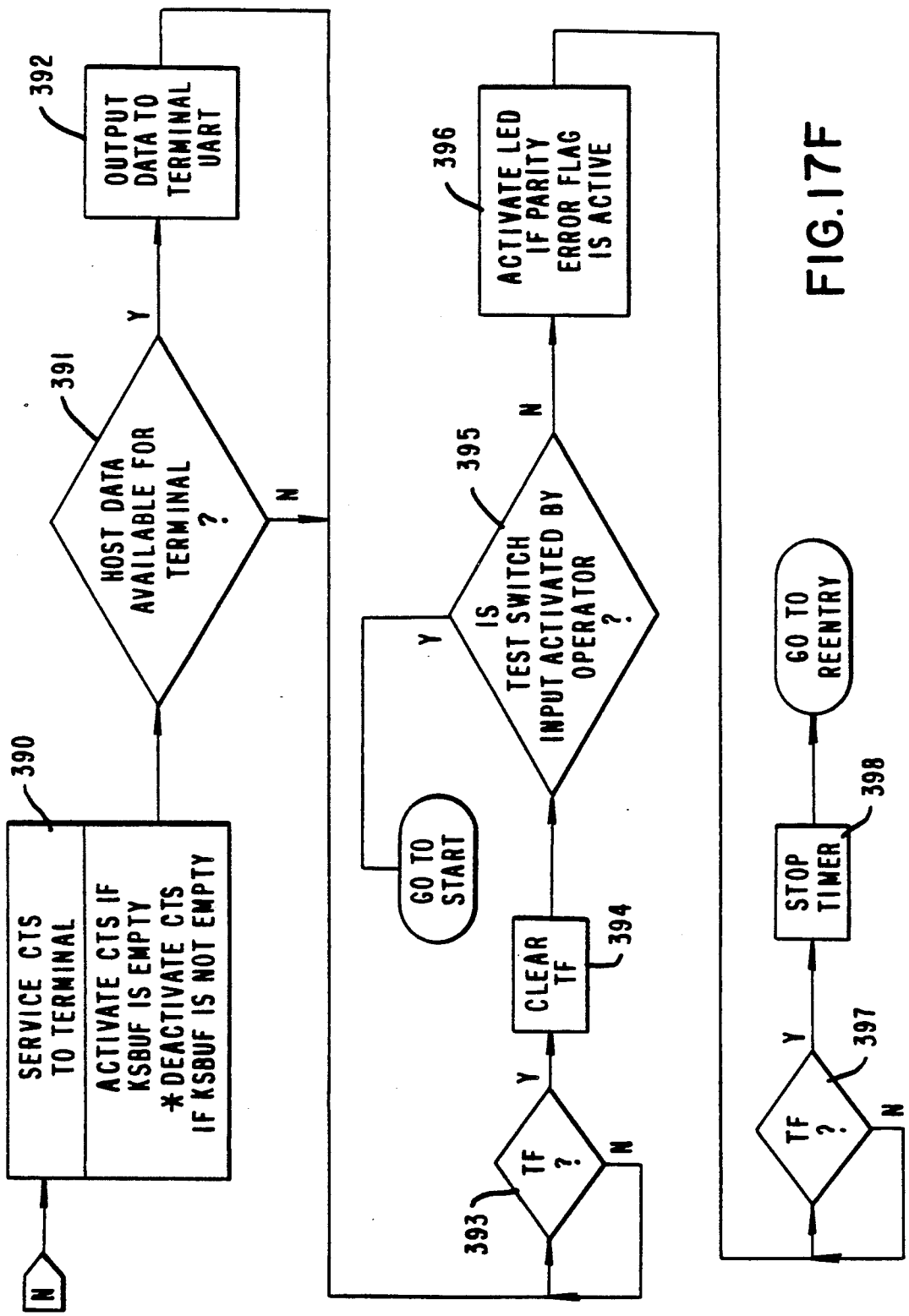

FIG. 15 is a flow chart of the time slot macro discussed in connection with blocks 243 through 257 for time slots 0-14. At 305, the timer flag is cleared. A data character is fetched at 306 from the RAM 54 for the next time slot identified by the data pointer (DPTR) location. The character found in the RAM 54 at the data pointer location is saved in register R5, and the data pointer is incremented at 308. At 309, the validity character is fetched from the RAM at the data pointer location At 310, the data pointer is incremented. A check is made at 311 to determine if the character is valid. As discussed earlier, this validation is made by checking the high order bit to determine if it is a one or zero. If the bit is one, the character is valid, and if the bit is zero, the character is not valid. If the character is valid, the correct parity bit is set at 312, and the timer flag is checked at 313 to see if a new time slot has started. At the beginning of the new time slot, the character is transmitted at 314 on the RS485 transceiver. The macro is then exited at 315. Returning to the character check at 311, if the character is not valid, the program goes to a timer flag check at 316 to wait for the new time slot. At the beginning of the new time slot the program then exits at 315.

FIG. 16 is an overall flow chart for the program of microcomputer 80 of the terminal element 22 of FIG. 5. The flow chart of FIG. 16 starts at 325 with power on and includes an initialization routine at 326. At the beginning of each frame, the program does a sync acquisition routine at 327 for synchronizing the time slots of the terminal element 22 with the time slots of the controller 20. After the sync acquisition routine at 327, the program engages in a communications routine at 328 to receive data and transmit keystrokes over link 329 to the host computer 12. Data characters are transmitted to the terminal 330 over the data path 331, and keystroke data is received from the terminal 330 over the keystroke path 332, all as previously explained.

FIGS. 17A-17F joined at off page connectors H-N form a flow chart of the program of FIG. 16. The program starts at 335, and at block 336 initializes the stack and parity error flag of the microcomputer 80. The internal UART 92 of the microcomputer 80 (see FIG. 5) is initialized for 375 kilobaud at block 337. The microcomputer 80 then initializes the external terminal UART 100 of FIG. 5 at block 338. The external UART 100 is initialized at 19.2 kilobaud with each transmission having seven bits, odd parity and one stop bit. At 339, the microcomputer 80 fetches the user ID from nonvolatile user parameter storage 96 (see FIG. 5). The first two bytes of the user ID should match and should be in the hexidecimal ASCII range for the maximum number of users, in the exemplary case sixteen.

A check is made at 340 to see if the two bytes obtained from the nonvolatile parameter storage 96 of FIG. 5 do match. A check is made at 341 to see if the ID is within the hexidecimal ASCII range. If either of the checks at 340 and 341 are not met, a default ID of eight is installed at 342. The program at 343 performs a 30 millisecond delay. At 344, the user is prompted with an option to change the user ID. At 345, the program conducts a check to see if the user desires to change the ID. If the user desires to change the ID, the program goes to 346 (off page connector H) wherein the user is prompted to input numbers from 0-F(H), and the response is installed at 347 into the nonvolatile memory 96 of FIG. 5. The program then goes to block 348 which exits from the set up and prompt user ID routine. If the user does not desire to change the user ID at 344, the program goes directly to block 348 (off page connector I). The prompt messages and ability to change the ID locally is linked to the presence of a jumper on the PROGENA* signal (see FIG. 6D). This provision is made so that a device such as a printer may be used in place of a terminal. It will be understood that if a printer is used, there will be no interactive capability such that a prompt may not be answered.

After exiting from the set up routine at 348, the program goes to 349 wherein it executes a 0.8 second delay. At 350, the ASCII ID is converted to 0-F(H) for use by the program. At 351, the value is incremented and saved in the parameter NVID-NUM for later use.

At 352, the timer 99 in the microcomputer 80 is set up for automatic reload after 48 microseconds. The aforementioned Intel document fully discloses how an internal timer in the microcomputer 80 may be thus set up. At 353, the microcomputer 80 begins to search for a character received from the host computer 12. At 354, a check is made to see if a character from the host computer 12 is available. If a character is not available at 354, the program returns to 353 to continue searching for a character. If a character is available at 354, the program goes to 355 to see if the character from the host computer is a valid sync/poll character. If at 355, a valid sync/poll character is not found, the program returns to 353 to continue searching for a valid character from the host computer 12. If the character at 355 is a valid sync/poll character, the program goes to 356 where the sync/poll character is saved and the time base is started for time slot 0. It will be understood that all of the terminal elements for all of the users 14 set their time base at 0 on the receipt of a valid sync/poll character, and thus all terminal elements 22 are independently operating on the same time base.

A plurality of receive macros 357-372 are provided for time slots 0-15 for the receipt of character data from the host computer 12. A check, to be discussed, is provided in each of the macros 357-372 such that the present user can select the character data and its designated time slot, as previously described.

At 373, the timer flag is cleared such that time slot 16 may be started. At 374, the low nibble of the sync/poll character is checked to see if it is equal to the ID of the present user. If the ID is equal to the low nibble of the sync/poll character, the RS 485 driver is turned on at 375. A check is made at 376 to determine if a break character is present from the terminal to be transmitted to the host computer. If a break character is not to be transmitted, a check is made at 377 to determine if keystroke data is available for sending to the host computer 12. If keystroke data is available, normal odd parity is prepared at 378. At 379, a keystroke flag is set for use in time slot 17. At 381, a check is made for the timer flag to determine if time slot 17 has started. Returning to the check at 376, if a break character is to be transmitted, the program goes to 380 wherein an 55(H) is inserted in the keystroke buffer and even parity is prepared. The program then goes to block 379 previously described. If at check 377, keystroke data is not available for sending to the host computer 12 the program goes to the timer flag check at 381 to wait for time slot 17. Also at the check 374, if the low nibble of the sync/poll character is not equal to the ID of the present user, the program goes directly to the timer flag check 381 (off page connector K) to wait for time slot 17.

When the timer flag is found at 381, the program goes to 382 wherein the timer flag is cleared. At 383, a check is made of the keystroke flag (see 379) to determine if keystroke data is available. If keystroke data is available, the program goes to 384 to transmit the keystroke data to the controller 20 of the host computer 12, as previously described. At 385, the timer flag is checked to await the beginning of the time slot 18. It will be noted that at the check 383, if the keystroke flag is not set, the program goes directly to the timer flag check 385. At the beginning of time slot 18, the timer flag is cleared at 386, and the RS 485 driver is turned off at 387. A check is made at 388 to determine if any data is available from the terminal UART 100 (see FIG. 5). If data is available, the character is fetched and saved in the keystroke buffer at 389, and the keystroke flag is set. The program then goes to 390, wherein the CTS signal to the terminal is serviced. This involves activating the CTS signal if the keystroke buffer is empty, or deactivating the CTS signal if the keystroke buffer is not empty. At 391, a check is made to determine if host data is available for the terminal. If data is available for the terminal, it is output to the terminal UART 100 at 392. At 393, the timer flag is checked to wait for time slot 19. It will be noted that at the check of 388, the program goes directly to the service CTS block 390 if data is not available from the terminal UART 100. At the check 391, the program goes directly to the timer flag check 393 if host data is not available for the terminal.

At the beginning of time slot 19, the program goes to 394 to clear the timer flag. At 395, a test is made to see if a test switch input has been activated by the operator. If the test switch input is activated, the program goes to the start (335 at FIG. 17A) to reinitialize and start the program over. If the test switch input is not activated, the program goes to block 395 wherein the LED CR3 (see FIG. 6E) is activated if the parity error flag is active. The program then goes to 397 to check for the timer flag and wait for time slot 20. At the beginning of time slot 20, the internal timer is stopped at 398 and the program goes to re-entry (352 at FIG. 17B) to setup the timer and wait for a new time frame having a valid sync/poll character, as previously described.

Figure 18:
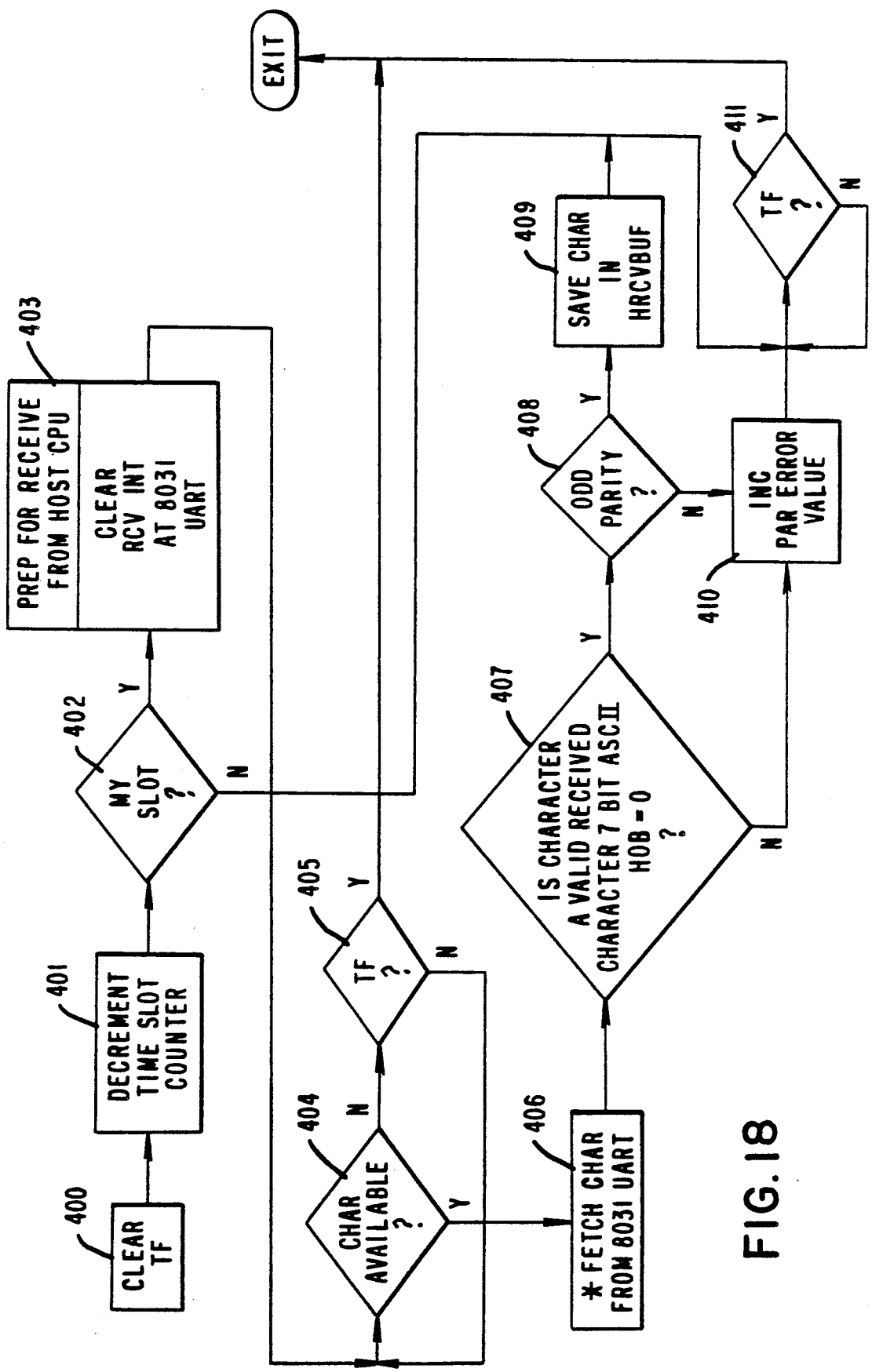
FIG. 18 is a flow chart of a receive macro of the program of FIG. 16.

FIG. 18 is a flow chart of the received macro described in connection with blocks 357-372 of FIG. 16C. At the beginning of the macro at 400 the timer flag is cleared. At 401, the time slot counter in the parameter NVID-NUM discussed in connection with block 351 is decremented. At 402, a check is made to determine if the decremented time slot counter is equal to zero.

Blocks 401 and 402 are actually a decrement and jump statement. When the counter decremented in 401 reaches zero, the program recognizes that the present time slot is the time slot designated for the present user. If the check at 402 is yes, the program at 403 prepares to receive data from the host computer 12. In block 403, the RCV INTR signal is cleared and the internal UART 92 of the micro controller 80 of FIG. 5 is prepared to receive data from the host computer 12. At 404, a check is made to see if a character is available. If not, a check of the timer flag is made at 405 to see if the time slot has finished. If not, the program returns to the character available check at 404 waiting for the receipt of a character. If a character is received before the end of the time slot, the check at 404 is yes and the program continues to block 406 to fetch the character from the internal UART 92. The fetched character is checked at 407 to see if the character is a valid received character by checking to see if the high order bit is zero, as previously described. If the received character is valid, a check is made at 408 to see if odd parity is present. If odd parity is present at 408, the character is saved in the HRCV buffer at 409, and the program goes to the timer flag check at 411 to wait for the end of the time slot. If the character is not valid at 407 or if odd parity is not present at 408, the program goes to 410 wherein the parity error value is increased to indicate that a parity error has been detected. After 410, the program goes to the timer flag check at 411. It will be seen that if the present macro is not in the assigned time slot, the check at 402 will transfer directly to the timer flag check at 411 to wait for the end of the time slot. When the time slot ends as determined by the check at 411, the macro exits to go the next macro, or if a total of sixteen macros has been executed, to go to the beginning of time slot 16 (see block 373, FIG. 17C), as previously described.

Thus, a system has been described which provides the aforementioned objects. It will be understood by those skilled in the art that the disclosed embodiment is exemplary only, and that the various elements disclosed ma be replaced by equivalents without departing from the invention hereof, which equivalents are covered by the appended claims.

What is claimed is:

1. A data processing network comprising:
   a host computer;
   a plurality of terminals, each terminal having an assigned identification;
   a cable means for transmitting data between said host computer and said plurality of terminals;
   a controller means connected solely to one end of said cable means between said host computer and said cable means, said controller means for receiving character data from said host computer and placing said character data on said cable means for transmission to said plurality of terminals, and for receiving keystroke data from each of said terminals over said cable means and transmitting said keystroke data to said host computer, said controller means having means for transmitting a cycle of time frames, each time frame having a plurality of time slots, with one time slot allocated for sending a single character to an associated terminal, each time frame further having a time slot for transmission of a single keystroke from a specified terminal to said host computer; and
   a plurality of terminal element means, each of said terminal element means connected to a respective one of said terminals and to said cable means, each of said terminal element means for receiving character data transmitted from said host computer over said cable means, and for receiving keystroke data from its associated terminal for transmission over said cable means to said host computer.

2. The data processing system of claim 1 wherein said controller means further includes a sync/poll character generating means, said sync/poll character generating means generating a sync/poll character to be transmitted over said cable means to start each time frame in each of said terminal element means.

3. The data processing system of claim 2 wherein each of said terminal element means includes timer means and means responsive to said sync/poll character for starting said timer means, such that the timer means of each terminal element means determines the time slots of each time frame for determining the allocated time slot of its associated terminal.

4. The data processing system of claim 3 wherein said controller means further includes means for transmitting a terminal identification with said sync/poll character, and each of said terminal element means includes means responsive to the identification of its associated terminal in said sync/poll character for responsively transmitting a keystroke over said cable means to said host computer.

5. The data processing system of claim 4 wherein said controller means includes first memory means for storing keystroke data received from said plurality of terminals, and second memory means for storing character data received from said host computer.

6. The data processing system of claim 4 wherein each of said terminal elements includes nonvolatile storage means for storing the identification of its associated terminal.

7. The data processing system of claim 1 wherein said cable means is a twisted pair shielded cable connected in daisy chain fashion to each terminal of said plurality of terminals.

8. A controller for controlling the transmission of data over a cable between a host computer and a plurality of terminals, said controller connected solely to one end of said cable between said host computer and said cable, said controller comprising:
   first memory means having a plurality of designated locations, each designated location for storing character data to be transmitted to one of the said plurality of terminals;
   second memory means for storing keystroke data from the plurality of terminals in a first-in-first-out manner;
   timer means for timing a cycle of time frames, each time frame having a plurality of time slots;
   means for transmitting to the plurality of terminals, the contents of said designated locations of said first memory means in said time slots of each time frame with one time slot being allocated for each terminal; and
   means for receiving a keystroke from one of the terminals in a further designated time slot of each time frame, and storing the received keystroke in said second memory means.

9. The controller of claim 8 wherein said first memory means includes means for storing indicators associated with each of said designated locations for indicating whether the contents of said designated locations have been transmitted to said plurality of terminals, said controller further comprising:
   means for updating said indicators when the contents of said designated locations are transmitted to said terminals; and
   means for blocking the transmission of the contents of a designated location when its associated indicator indicates that the contents have been transmitted to said plurality of terminals.

10. The controller of claim 8 further comprising means for transmitting a sync/poll character at the beginning of each time frame.

11. The controller of claim 10 further comprising means for including in each sync/poll character the identification of a terminal which may transmit a keystroke to the controller in the current time frame.

12. The controller of claim 11 further including means in said second memory means for storing the identification of the terminal sending each keystroke stored in said second memory means.

13. In a data processing network having:
   a host computer;
   a plurality of terminals, each terminal having an assigned identification;
   a cable means for transmitting data between said host computer and said plurality of terminals;
   a controller means connected solely to one end of said cable means between said host computer and said cable means, said controller means for receiving character data from said host computer and placing said character data on said cable means for transmission to said plurality of terminals, and for receiving keystroke data from each of said plurality of terminals over said cable means and transmitting said keystroke data to said host computer; and
   a plurality of terminal element means, one of said terminal element means connected to each of said terminals and said cable means, each of said terminal element means for receiving character data transmitted from said host computer over said cable means, and for receiving keystroke data from its associated terminal for transmission over said cable means to said host computer;
   a method of establishing a protocol for the transfer of data comprising:
   generating a plurality of time slots;
   dividing said time slots into a cycle of time frames;
   allocating one time slot in each time frame for transmitting a single character from said host computer to each terminal of said plurality of terminals; and
   allocating one time slot in each time frame for transmitting a single keystroke from a designated terminal of said plurality of terminals to said host computer.

14. The method of claim 13 further comprising generating a sync/poll character by said controller means to be transmitted over said cable means to start each time frame in each of said terminal element means.

15. The method of claim 14 further comprising, responsive to said sync/poll character, determining by timer means in each of said terminal elements, the allocated time slot of its associated terminal.

16. The method of claim 15 further comprising transmitting a terminal identification with said sync/poll character, and, responsive to the identification of its associated terminal in said sync/poll character, transmitting a keystroke over said cable means to said host computer from the identified terminal.

17. The method of claim 16 further comprising storing keystroke data received from said plurality of terminals in a first memory means in the controller means, and storing character data received from said host computer in a second memory means in the controller means.

18. The method of claim 17 further comprising storing the identification of its associated terminal in a nonvolatile storage means in each terminal element means.

19. A data processing network comprising a plurality of terminals connected to a data transmission cable and a controller connected solely to one end of said cable, wherein said controller transmits a cycle of time frames, each time frame having a plurality of first time slots, with each first time slot allocated for sending a single character from said controller to an associated terminal, each time frame further having a plurality of second time slots, with each second time slot allocated for transmission of a single keystroke from a specified terminal to said controller.

20. The data processing network of claim 19 wherein each of said terminals includes a terminal element for receiving character data from said controller and for receiving keystroke data from its associated terminal for transmission over said cable.

* * * * *